US008788594B2

(12) United States Patent
Ochiai

(10) Patent No.: US 8,788,594 B2
(45) Date of Patent: Jul. 22, 2014

(54) DATA PROCESSING APPARATUS AND DATA PROCESSING SYSTEM

(75) Inventor: Masato Ochiai, Yokohama (JP)

(73) Assignee: Canon Kabushiki Kaisha (JP)

( * ) Notice: Subject to any disclaimer, the term of this patent is extended or adjusted under 35 U.S.C. 154(b) by 1587 days.

(21) Appl. No.: 11/671,458

(22) Filed: Feb. 5, 2007

(65) Prior Publication Data

US 2007/0183448 A1 Aug. 9, 2007

(30) Foreign Application Priority Data

Feb. 7, 2006 (JP) .................................. 2006-029748

(51) Int. Cl.
*G06F 15/173* (2006.01)

(52) U.S. Cl.
USPC ............... 709/206; 709/225; 709/245; 710/8; 358/401

(58) Field of Classification Search
USPC .......... 358/401, 402, 442, 474; 709/203, 204, 709/206, 225, 245; 710/8, 9, 11, 33, 36
See application file for complete search history.

(56) References Cited

U.S. PATENT DOCUMENTS

| 6,421,779 | B1* | 7/2002 | Kuroda et al. ................ 713/169 |
| 6,806,976 | B1* | 10/2004 | Suyehira ...................... 358/1.14 |
| 7,631,107 | B2* | 12/2009 | Pandya .......................... 709/250 |
| 2001/0005858 | A1* | 6/2001 | Ohno et al. ................... 709/223 |
| 2001/0014908 | A1* | 8/2001 | Lo et al. ........................ 709/203 |
| 2001/0029516 | A1* | 10/2001 | Mizuno ......................... 709/100 |
| 2002/0107983 | A1* | 8/2002 | Iyoki ............................. 709/245 |
| 2004/0017588 | A1* | 1/2004 | Nakata et al. ................. 358/402 |
| 2004/0042034 | A1* | 3/2004 | Tiffan et al. .................. 358/1.15 |
| 2004/0158733 | A1* | 8/2004 | Bouchard ..................... 713/200 |
| 2004/0186892 | A1* | 9/2004 | Maruyama et al. .......... 709/206 |
| 2005/0060407 | A1* | 3/2005 | Nagai ............................ 709/225 |
| 2005/0097171 | A1* | 5/2005 | Hikichi ......................... 709/204 |
| 2005/0162706 | A1* | 7/2005 | Eguchi et al. ................. 358/442 |
| 2005/0177799 | A1* | 8/2005 | Knight et al. ................. 715/810 |
| 2006/0017982 | A1* | 1/2006 | Gaebel et al. ................. 358/400 |
| 2006/0262359 | A1* | 11/2006 | Lee ................................ 358/474 |
| 2012/0226772 | A1* | 9/2012 | Grube et al. .................. 709/217 |

FOREIGN PATENT DOCUMENTS

| JP | 2000-035869 A | 2/2000 |
| JP | 2000-244694 A | 9/2000 |
| JP | 2005-231158 A | 9/2005 |

OTHER PUBLICATIONS

Notification of Reason(s) for Refusal issued in corresponding Japanese Patent Application No. 2006-029748 dated Oct. 15, 2010. Full English translation provided; foreign Office Action provided in the IDS filed Nov. 11, 2010.

* cited by examiner

*Primary Examiner* — Khanh Dinh

(74) *Attorney, Agent, or Firm* — Rossi, Kimms & McDowell LLP

(57) ABSTRACT

A data processing apparatus that received destination information showing a data transfer destination through a network provides a destination ID as identification information for the destination information, and stores the destination ID together with the destination information. The user specifies the provided destination ID and instructs execution of processing at the date processing apparatus. The data processing apparatus transfers data obtained by executing the processing to a transfer destination corresponding to the specified destination ID.

8 Claims, 21 Drawing Sheets

F I G. 8
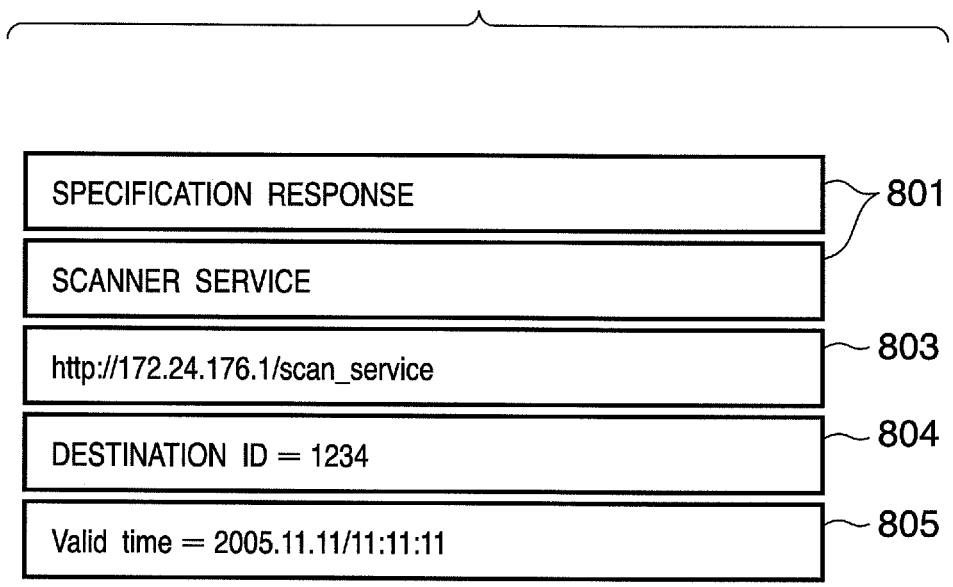

FIG. 9

| DESTINATION ID | TRANSFER DESTINATION | TERM OF VALIDITY |
|---|---|---|
| 1231 | ftp://172.24.177.200/folder | 2005.11.11.09:45:11 |
| 1232 | smb://172.24.175.175/folder | 2005.11.11.10:55:55 |
| 1233 | mailto : hoge@cano.com | 2005.11.11.11:00:00 |
| 1234 | http://172.24.176.100/myfolder | 2005.11.11.11:11:11 |

F I G. 10
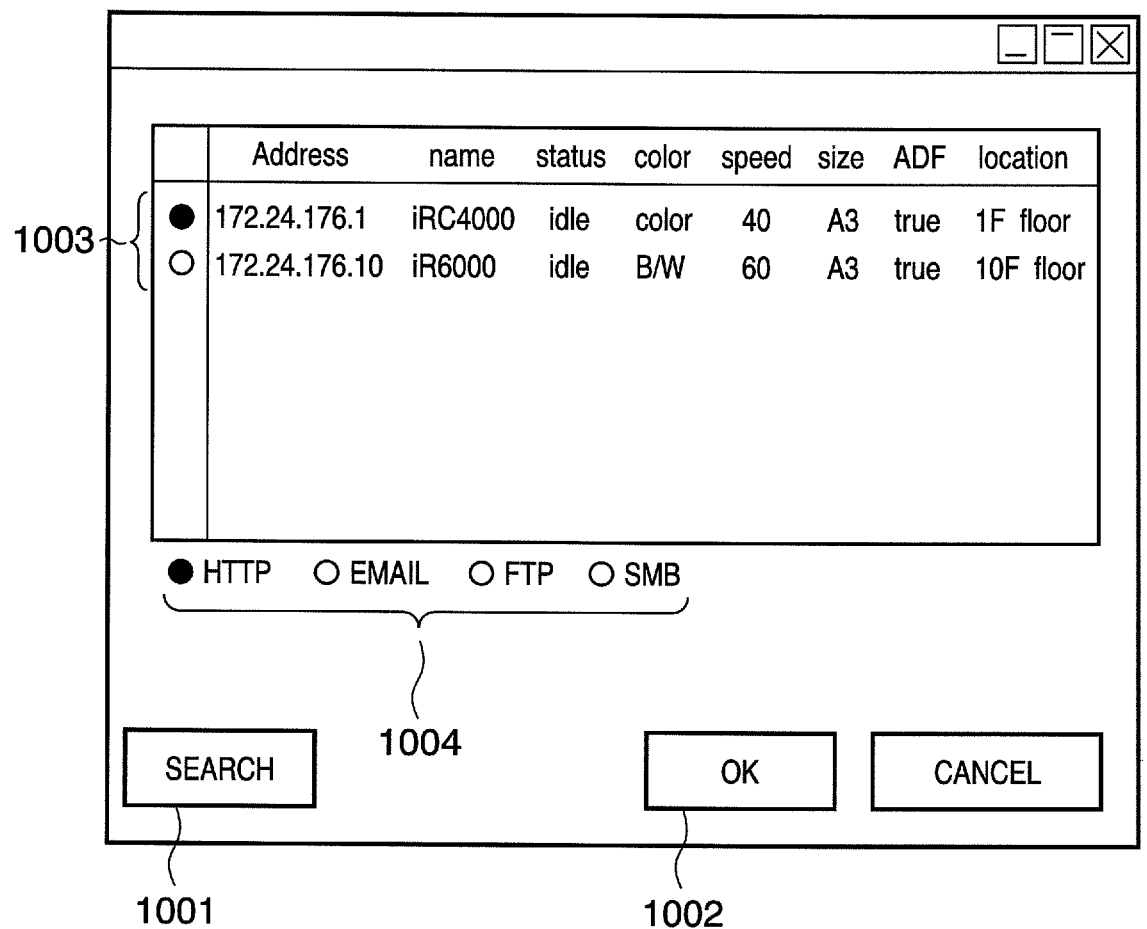

1301

F I G. 14
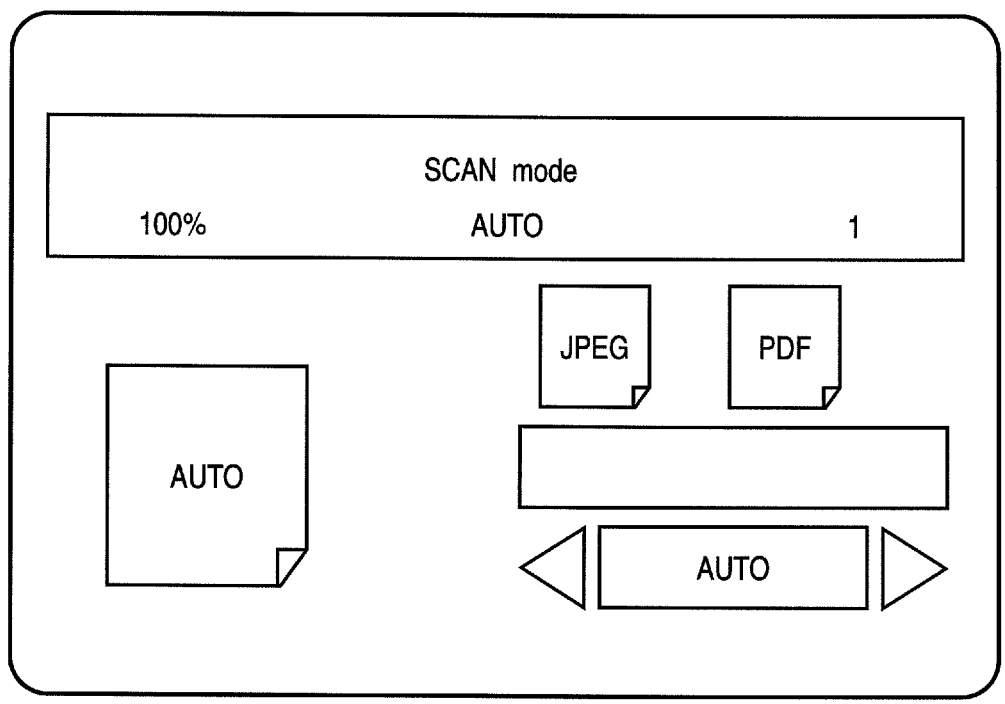

DATA PROCESSING APPARATUS AND DATA PROCESSING SYSTEM

BACKGROUND OF THE INVENTION

1. Field of the Invention

The present invention relates to a data processing apparatus and a data processing system, and more particularly to a data processing apparatus and a data processing system that can transfer data that was obtained by executing processing via a network.

2. Description of the Related Art

Data processing apparatuses (devices) already exist that provide a service that transfers data (scan data) obtained by scanning an original document to a computer (hereafter, referred to as "PC"). Through this service, it is possible for a user to utilize a physical original document as an electronic document on the user's own PC.

In order to utilize this service, after the user connects his own PC to the network, the user must perform an operation that transfers the scanned data from the device providing the service to his own PC. At this time, the user must specify the user's own PC as the transfer destination. As a method for the user to specify his own PC, for example, a method can be considered in which the user searches for his own PC from the device. However, when a large number of other PCs are connected to the same network, for example, identifying one's own PC from a list which includes a large number of PCs that are on the network is troublesome. There is also the possibility of transferring the data to a different PC by mistake.

A method is also known in which unique information of a PC such as an IP address or authentication information is input into a device (for example, see Japanese Patent Laid-Open No. 2000-244694). However, in this case, it is necessary for the user to know the IP address of the user's own PC. Further, an IP address is typically assigned dynamically when a PC connects to a network, and in some cases the assigned IP address is different from that assigned at the time of a previous connection. It is therefore necessary for the user to always confirm the current IP address. There is also the possibility that data will be erroneously sent to another PC due to a mistake when inputting the IP address.

Thus, when transferring scan data from a device to a PC that temporarily connects to a network, there are the problems that (1) an operation to input the IP address of a PC as the destination for the scan data takes time and effort, and (2) data may be erroneously transferred to a different PC.

For example, let us assume a case in which a malicious third person connects his own PC on a network and makes a setting to permit connection to his PC no matter what user name or password is used when an authentication request is made in order to transfer data from the device to that PC. In this case, there is the possibility that if a bona fide user enters the address of the PC of the malicious third person by mistake, the scan results will be transferred to the PC of the malicious third person. There is also the possibility that at this time, authentication information that enables connection to the PC of the bona fide user will be made known to the malicious third person.

SUMMARY OF THE INVENTION

The present invention was made in view of the problems of the prior art as described above. An object of the present invention is to reduce the trouble for a user with regard to specifying a transfer destination and also to suppress the occurrence of erroneous transfers with respect to a data processing system and a data processing apparatus that are capable of transferring data to a terminal that is connected to a network.

According to an aspect of the present invention, there is provided a data processing apparatus capable of transferring data obtained by execution of processing to a terminal on a network, comprising: an input unit for a user to input information; a reception unit which receives destination information showing a data transfer destination through the network; a provision unit which provides identification information with respect to the destination information received by the reception unit; a storage unit which stores the destination information in association with the identification information; a sending unit which sends the identification information to a terminal that is a source of the destination information; an execution unit which executes the processing; and a transfer unit which transfers data obtained by execution of the processing to the transfer destination based on the destination information that corresponds to identification information input through the input unit when the identification information input through the input unit is stored in the storage unit.

According to another aspect of the present invention, there is provided an information processing terminal which can communicate with data processing apparatuses capable of transferring data obtained by execution of processing to a terminal on a network, comprising: a first display control unit which causes a selection screen that allows a user to select one of the data processing apparatuses present on the network to be displayed on a display device; a sending unit which sends destination information which shows a transfer destination of data to a data processing apparatus selected through the selection screen; a reception unit which receives identification information sent from the selected data processing apparatus in response to the destination information; and a second display control unit which displays a screen which notifies the identification information to a user on the display device.

According to a further aspect of the present invention, there is provided a data processing system comprising a network, at least one information processing terminal which is provided on the network, and at least one data processing apparatus which is capable of transferring data obtained by execution of processing to the at least one information processing terminal, wherein, the data processing apparatus comprises:

an input unit for a user to input information; a reception unit which receives destination information showing a data transfer destination through the network; a provision unit which provides identification information with respect to the destination information received by the reception unit; a storage unit which stores the destination information in association with the identification information; a sending unit which sends the identification information to a terminal that sends the destination information; an execution unit which executes the processing; and a transfer unit which transfer data obtained by execution of the processing based on the destination information that corresponds to identification information input through the input unit when the identification information input through the input unit is stored in the storage unit; and wherein the information processing terminal comprises:

a first display control unit which causes a selection screen that allows a user to select the at least one data processing apparatus to be displayed on a display device; a sending unit which sends destination information which shows a transfer destination of data to a data processing apparatus selected through the selection screen; a reception unit which receives identification information sent from the selected data processing apparatus in response to the destination information; and a second display control unit which displays a screen which notifies the identification information to a user on the display device.

As described above, according to the present invention it is possible to reduce the trouble for a user with regard to specifying a transfer destination and also to suppress the occurrence of erroneous transfers with respect to a data processing system and a data processing apparatus that are capable of transferring data to a terminal that is connected to a network.

Further features of the present invention will be apparent from the following description of exemplary embodiments with reference to the attached drawings.

BRIEF DESCRIPTION OF THE DRAWINGS

FIG. 8 is a view showing an example of the format of a multifunction device specification response that is output by a multifunction device in response to a multifunction device specification request in an embodiment of the present invention;

FIG. 9 is a view showing an example of a destination ID table that is managed by a multifunction device in an embodiment of the present invention;

FIG. 10 is a view showing an example of a search result screen that is displayed on a display 401 of the PC 103 after reception of search responses in an embodiment of the present invention;

FIG. 14 is a view showing an example of a scan screen that is displayed on the touch panel 301 of a multifunction device according to an embodiment of the present invention;

DESCRIPTION OF THE EMBODIMENTS

Figure 1:
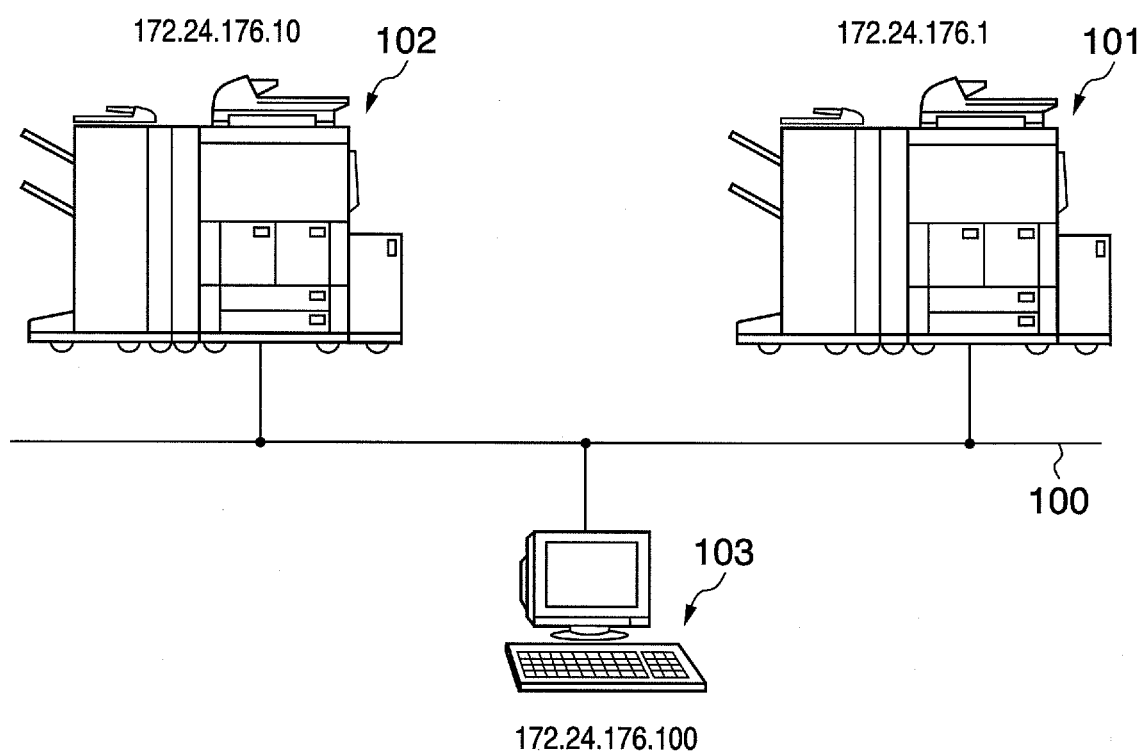
FIG. 1 is a view showing a state in which a multifunction device as one example of a data processing apparatus according to an embodiment of the present invention is connected to a computer network.

FIG. 1 is a view showing a configuration example of a data processing system according to an embodiment of the present invention.

In the data processing system, data processing apparatuses and information processing terminals that are capable of utilizing the services provided by the data processing system are communicably connected via a network. The data processing apparatuses can transfer data as the processing result of a predetermined service to an information processing terminal (hereafter, may be referred to simply as "terminal") on the network.

Reference numerals 101 and 102 denote multifunction devices (hereafter, referred to as "MFD") as one example of data processing apparatuses according to the present embodiment. The MFDs 101 and 102 have printer and scanner functions and execute data processing including a network printing service and network scanner service, and provide these services to information processing terminals on a LAN 100. A PC 103 is a user PC which is temporarily connected to the LAN 100 as an information processing terminal in order to utilize the services of the MFDs 101 and 102.

According to the present embodiment, the PC 103 searches for MFDs that provide a service (in this case, the MFDs 101 and 102) on the LAN 100, and displays on the PC 103 a destination ID that is provided by one MFD designated from among the MFDs on the LAN 100. Thereafter, the user inputs the destination ID that was displayed on the user's own PC 103 into the designated MFD, to thereby enable transfer of data from that MFD to the PC 103. These processes are described in detail later.

Figure 2:
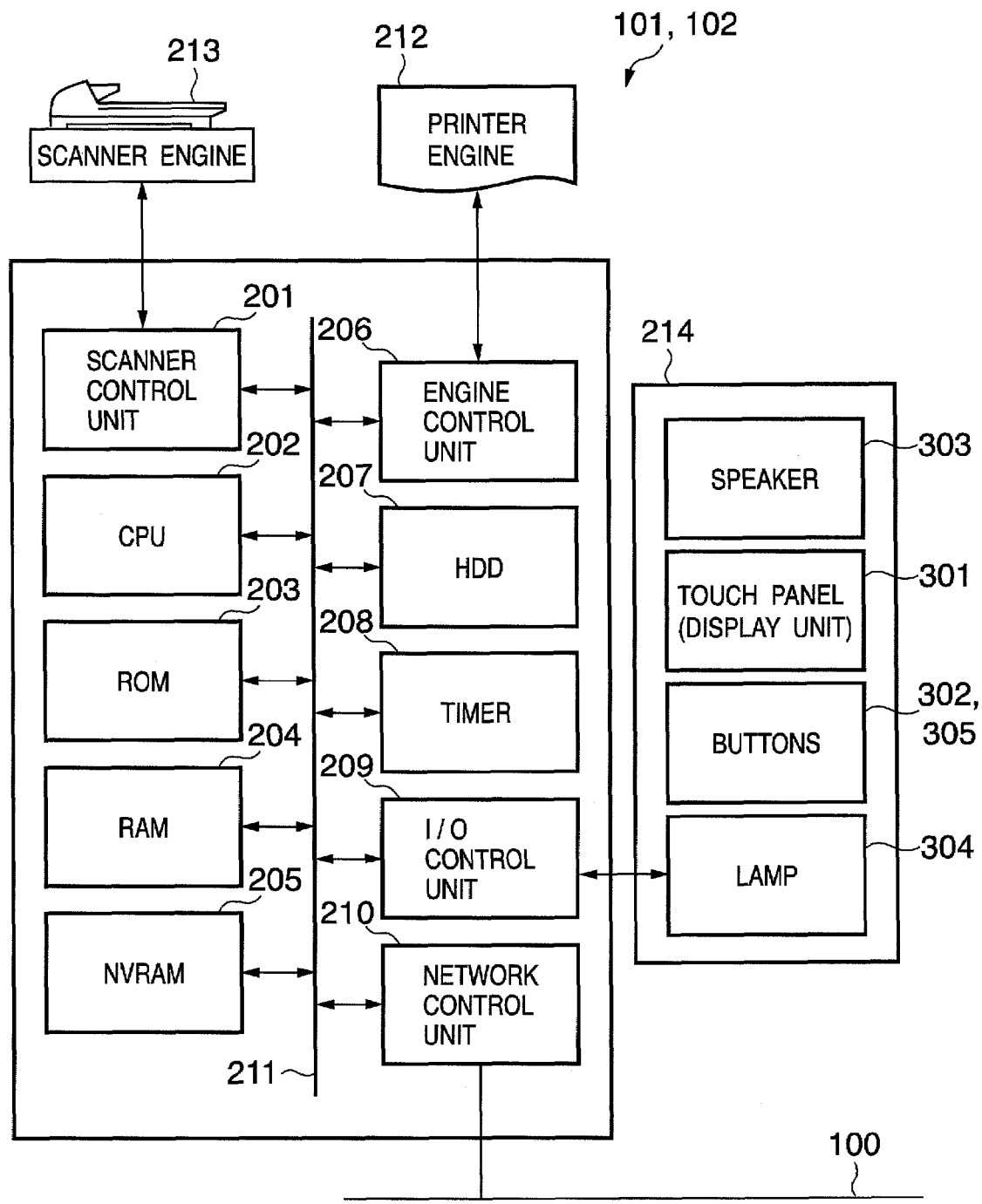
FIG. 2 is a block diagram illustrating an example of a schematic configuration of a multifunction device according to this embodiment.

FIG. 2 is a block diagram illustrating a schematic configuration example of an MFD according to the present embodiment.

A scanner control unit 201 controls a scanner engine 213. Reference numeral 202 denotes a CPU, and a ROM 203 stores a boot program. Reference numeral 204 denotes a RAM (memory), and reference numeral 205 denotes a nonvolatile RAM (NVRAM) for holding set values and the like. An engine control unit 206 controls a printer engine 212. Reference numeral 207 denotes a hard disk drive (HDD), and reference numeral 208 denotes a timer. An I/O control unit 209 controls input and output with respect to an input unit 214. The input unit 214 inputs information or instructions for an MFD from a user, and outputs various information using speech, characters, images and the like. According to the present embodiment, the input unit 214 has a touch panel (also serving as a display unit), buttons, a lamp, and a speaker. Naturally, the input unit 214 may include other input and output devices and need not include some of these parts. Reference numeral 210 denotes a network control unit for conducting communication with other apparatuses on the LAN 100. A bus 211 connects each component, excluding the scanner engine 213, the printer engine 212 and the input unit 214.

A program that controls the MFDs according to the present embodiment is stored on the HDD 207, and when the power is turned on the CPU 202 reads the boot program from the ROM 203. The CPU 202 then executes the boot program, reads a device control program from the HDD 207 and expands it in the RAM 204, and executes the expanded device control program to conduct control of the MFDs.

Figure 3:
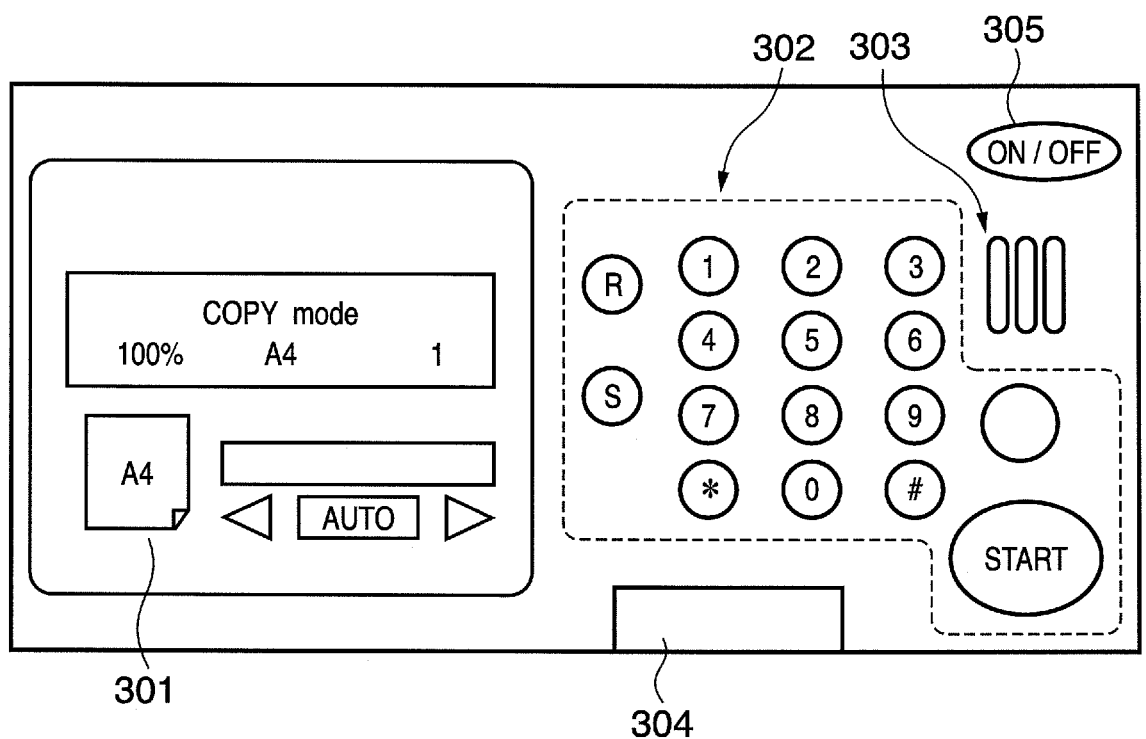
FIG. 3 is an outside drawing illustrating a specific configuration example of an input unit 214 of the multifunction device according to this embodiment.

FIG. 3 is an outside drawing illustrating a specific configuration example of the input unit 214.

The touch panel 301 is fitted on the screen of a display device that is, for example, an LCD. By displaying a GUI screen on the display device, a user can intuitively operate buttons or keys on the GUI screen. In the example shown in FIG. 3, the display state of a standby screen in copy mode is shown. According to the present embodiment, a user can make various settings using the touch panel 301. Hereafter, to facilitate description and understanding, a description is given that assumes that the touch panel 301 has a display function.

Various buttons 302 include a numeric keypad comprising numeric keys 0-9, a * key and a # key, a service button "S", a settings button (R), a start button and a stop button. When the service button "S" is depressed, a screen for utilizing various services other than the copy service is displayed on the touch panel 301.

According to this embodiment, the MFD activates a network scan service in response to depression of the service button "S", and transfers data that was scanned with the scanner engine 213 to the designated PC.

When the settings button (R) is depressed, the MFD displays a screen for making various settings on the touch panel 301. When a user wishes to make various settings, the user depresses the settings button (R) and can then make various settings by operating the touch panel 301 in accordance with the settings screen.

A speaker 303 outputs speech or buzzer sounds and the like. A lamp 304 is used to notify a user of the power ON/OFF state, the operating mode (power saving mode or normal mode), whether or not an error occurred and the like. For example, when a paper jam occurs, the lamp 304 flickers. An ON/OFF button 305 is a button for specifying to shift to power saving mode (ON) or to return to normal mode from power saving mode (OFF).

Figure 21:
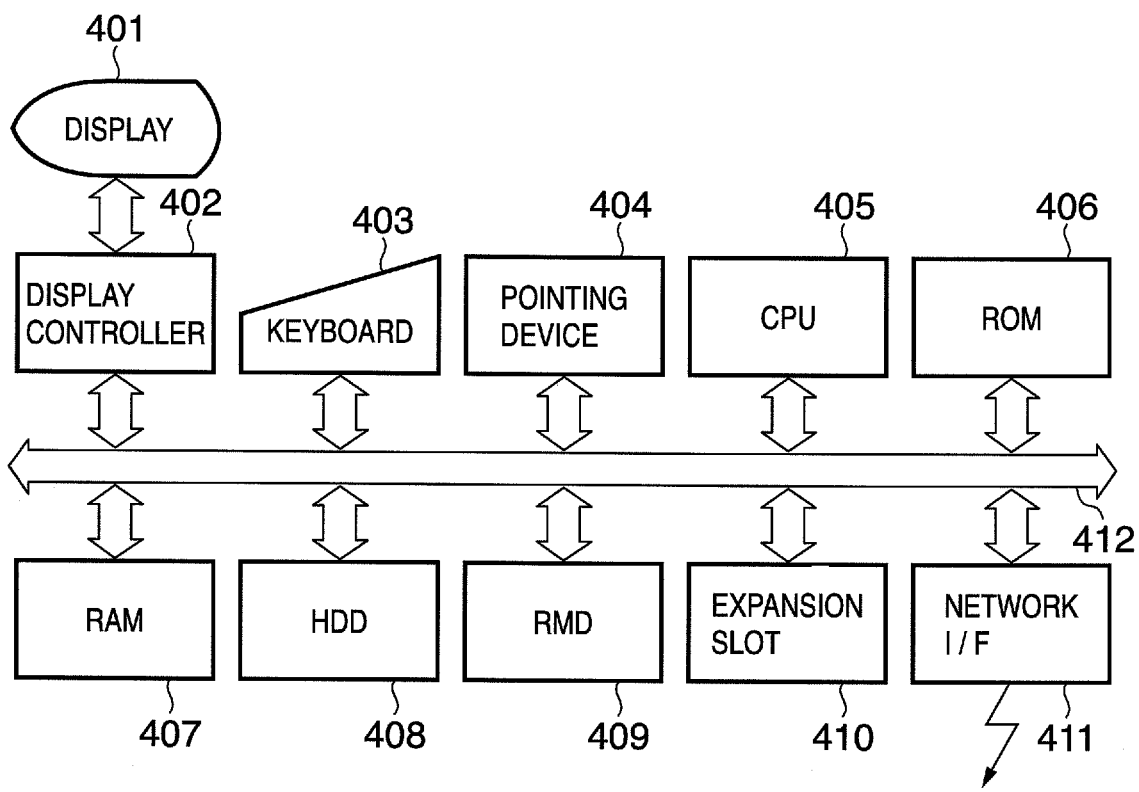
FIG. 21 is a block diagram showing a configuration example of the PC 103 according to an embodiment of the present invention.

FIG. 21 is a block diagram showing a configuration example of the PC 103 according to the present embodiment.

In FIG. 21, a display 401 displays information regarding data that is being processed by an application program, various message menus and the like. The display 401 is composed of a CRT (Cathode Ray Tube), an LCD (Liquid Crystal Display) or the like. A display controller 402 performs screen display control with respect to the display 401. A keyboard 403 and a pointing device 404 are used to input characters and the like and to designate and display icons or buttons or the like on a GUI (Graphical User Interface). The CPU (Central Processing Unit) 405 is responsible for overall control of the PC 103.

A ROM (Read Only Memory) 406 stores programs executed by the CPU 405 and parameters and the like. A RAM (Random Access Memory) 407 is used as a work area when the CPU 405 executes various programs or a temporary save area at a time of error processing and the like.

A hard disk drive (HDD) 408 and a removable media drive (RMD) 409 function as external memory devices. The removable media drive is a device that performs read/write or readout with respect to a detachable recording medium, and may consist of a flexible disk drive, an optical disk drive, a magneto-optical disk drive or a memory card reader, and may also be a detachable HDD or the like.

In this connection, programs for implementing various functions, the OS, application programs such as a browser, data and a library and the like of the PC 103 according to this embodiment are stored on one or more members of the group consisting of the ROM 406, the HDD 408 and the (recording medium of the) RMD 409 in accordance with the intended use.

An expansion slot 410 is a slot for mounting an expansion card that conforms, for example, to PCI (Peripheral Component Interconnect) bus standards. Various expansion boards such as a video capture board, a sound board, a GPIB board and the like can be mounted in the expansion slot 410.

A network interface 411 has a wired communication function that conforms to USB (Universal Serial Bus) standards, IEEE 1394 standards, Ethernet or the like. Alternatively, the network interface 411 has a wireless communication function that conforms to IEEE 802.11a/b/g standards, Bluetooth standards or the like. The PC 103 according to this embodiment is configured to be able to communicate with the MFDs 101 and 102 using the network interface 411. A bus 412 comprises an address bus, a data bus and a control bus, and connects each of the aforementioned parts.

By using the OS and necessary driver software and the like, the PC 103 configured as described above can communicate with other devices on a computer network or a public switched telephone network through a device that is connected as required via the network interface 411 or a serial interface. Examples of a device that is connected as required to an interface include a router (including a dialup router), a modem and a TA.

Figure 4:
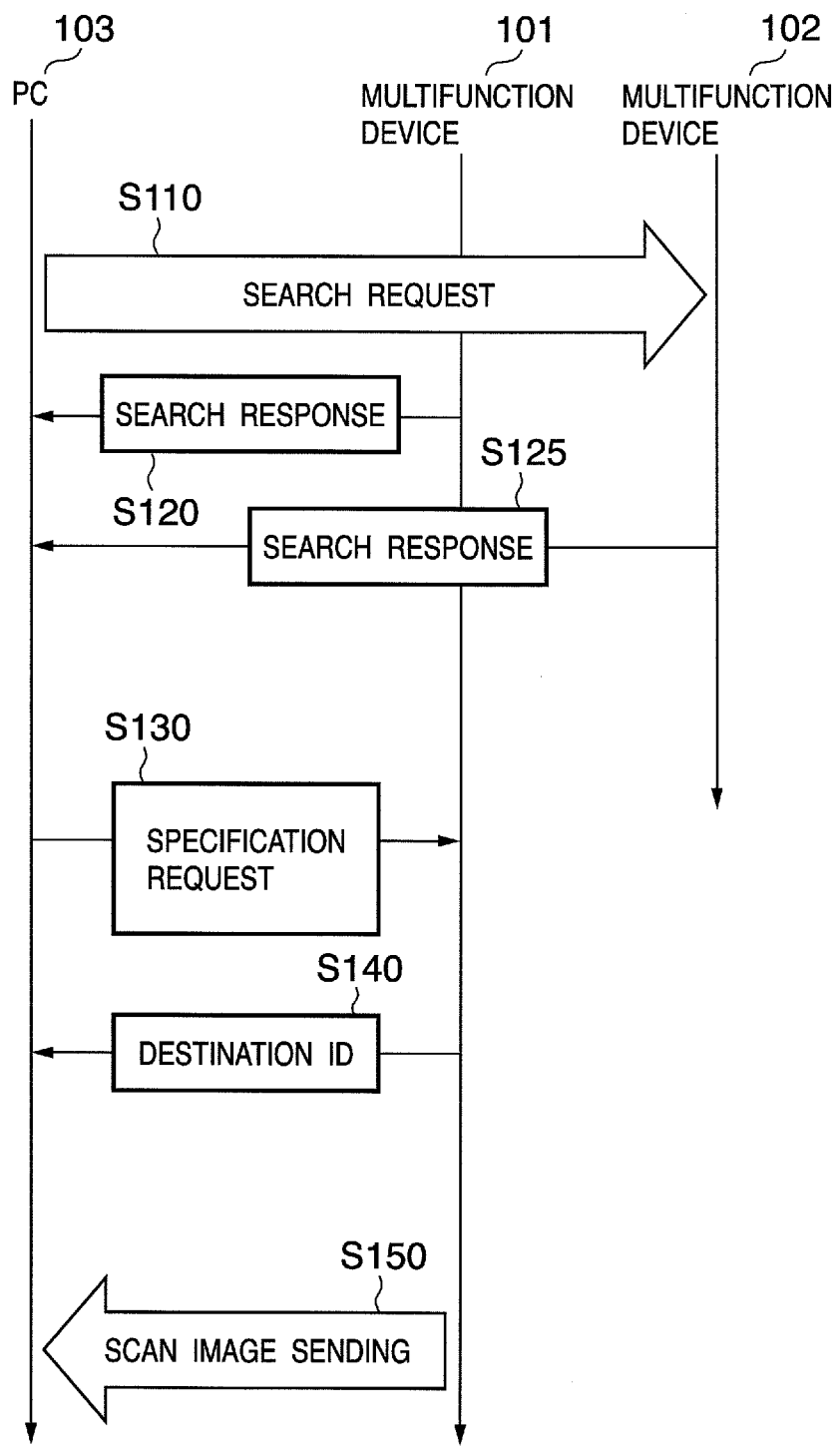
FIG. 4 is a sequence chart that describes the flow of data that is sent and received between each multifunction device and the PC in the network configuration shown in FIG. 1 when the service provided by a multifunction device 101 is utilized from a PC 103.

FIG. 4 is a sequence chart that describes the flow of data that is sent and received between each MFD and the PC in the network configuration shown in FIG. 1.

In this connection, the operations of the PC 103 described in the following are actually implemented by the CPU 405 of the PC 103 executing programs such as the OS or applications for service utilization that operate on the PC 103. Hereafter, an application for service utilization is referred to as a "client application".

First, when a user connects the PC 103 to the LAN 100 through the network interface 411, the PC 103 is assigned an IP address by communication with an unshown DHCP server. Since the operating procedures up to establishment of communication when the PC 103 is connected to the LAN 100 are known and are not related to the essence of the present invention, a description thereof is omitted.

Next, the user, for example, activates an application for service utilization (hereafter, referred to as "client application"). In this example, a case is described in which the user wishes to utilize a scanner service provided by an MFD and transfer scan data to the PC 103. In order to ascertain which MFDs are present on the LAN 100, the client application sends a search request to search for MFDs by multicast or broadcast communication on the LAN 100 (step S110). This search request may also be sent by an explicit instruction of the user such as by depressing a search button on the screen shown in FIG. 10 as described later.

According to this embodiment, since two MFDs, the MFDs 101 and 102 are connected to the LAN 100, these two MFDs each send response data with respect to the search request (steps S120 and S125). The response data includes unique information (model name, capacity, address etc.) of each MFD, as described later using FIG. 6.

The client application of the PC 103 displays the search response results on the display 401 in a list format, for example, as shown in FIG. 10, and requests the user to specify the MFD that the user wishes to utilize. The user selects the desired MED (in this case, taken to be the MFD 101) from the list using, for example, the pointing device 404.

In response to this selection, the client application of the PC 103 sends a specification request for specifying the transfer destination and the like to the selected MFD 101 (step S130). With respect to this specification request, the MFD 101 sends a destination ID as a response to the specification request (step S140). The client application of the PC 103 displays the received destination ID on the display 401. The user, for example, transcribes or prints the displayed destination ID onto paper.

The user then goes the MFD 101 to execute the scan, and places a document in the scanner engine 213 of the MFD 101. The user also uses the input unit of the MED 101 to input the destination ID that was displayed on the display 401 of the PC 103, and designates that a scan is to be executed. The MFD 101 reads an image of the document to generate scan data and converts the scan data into an arbitrary electronic data format. The MFD 101 then transfers the scan data to the PC 103 on the basis of the destination ID.

The details of the processing at each of these steps will now be described in sequence.

Figure 5:
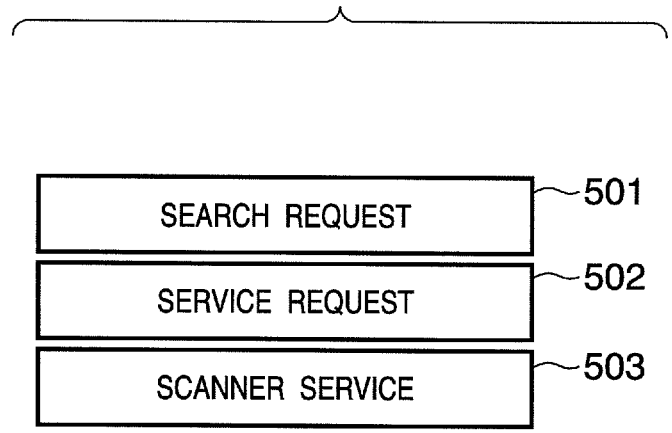
FIG. 5 is a view showing an example of the format of a search request that is output by the PC 103 in an embodiment of the present invention.

FIG. 5 is a view showing an example of the format of a search request that a client application of the PC 103 generates and outputs according to the present embodiment.

A field 501 indicates the classification of this packet. In this case, it specifies that the packet is a search request.

A field 502 indicates which kind of search this packet is requesting. In this case, it specifies that a service search is being requested.

A field 503 indicates which kind of service is being searched for. According to the present embodiment, since a scanner service is being searched for, scanner service is specified in the field 503. Naturally, when the user wishes to utilize another service, the value is specified according to the desired kind of service.

The PC 103 outputs this search request using a packet format that is in accordance with the communication protocol of the LAN 100.

Figure 6:
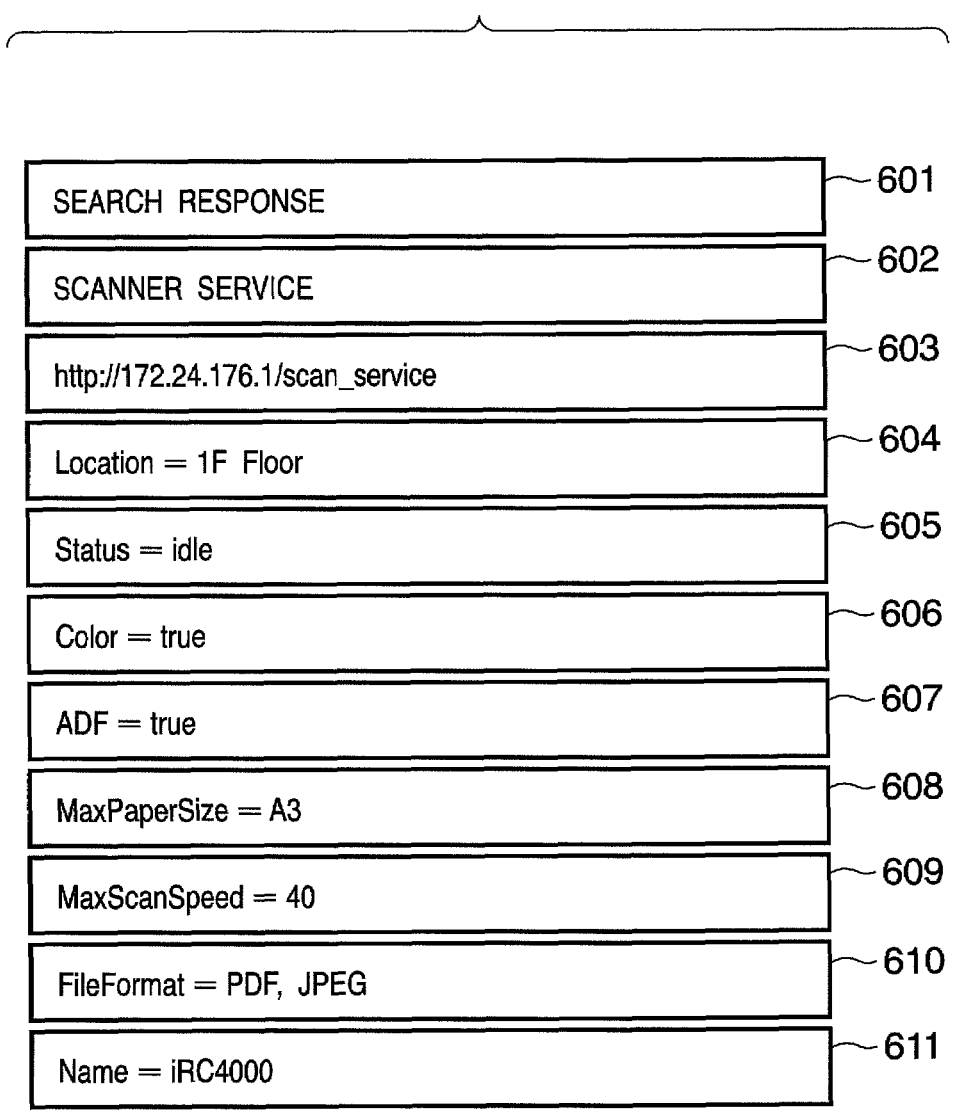
FIG. 6 is a view showing an example of the format of a search response that is output by a multifunction device in response to a search request in an embodiment of the present invention.

FIG. 6 is a view showing an example of the format of response data that is output by an MFD in response to a search request according to the present embodiment.

A field 601 indicates that the data is a response to a search request.

A field 602 indicates that a scanner service is provided. A field 603 shows a URL that provides a scanner service. In this embodiment the URL is http://172.24.176.1/scan_service.

Fields 604 to 610 are fields indicating attributes of the scanner service provided by this MFD. The field 604 displays locational information that indicates the location of the MFD, and shows that the MFD is located on the first floor (1F floor). The field 605 indicates the status of the scanner service, and it shows that the scanner service is currently idle (on standby). The field 606 indicates that the scanner engine 213 is capable of reading color images. The field 607 indicates that the MFD has an ADF function. The field 608 indicates the maximum document size that can be read by the scanner engine 213, and in the case shown in FIG. 6 it indicates that the scanner engine 213 can read images up to A3 size. The field 609 indicates the scan speed (number of sheets of A4 original documents that are read per minute) of the scanner engine 213, and in the case shown in FIG. 6 it indicates that the scanner engine 213 can read 40 sheets of A4 original documents in one minute. The field 610 indicates which kinds of electronic format the scan data can be converted into, and in the case shown in FIG. 6 it indicates that scan data can be converted into PDF format and JPEG format. The field 611 indicates the model name of the MFD.

FIG. 7A to FIG. 7D are views showing examples of the format of a specification request for specifying an MFD that a client application of the PC 103 generates and outputs in the present embodiment.

In this embodiment, the specification request can take the formats shown in FIGS. 7A to 7D in accordance with the method of transferring the scan data.

When the user specifies the MFD whose service the user wants to use and the protocol to be used for data transfer, the client application of the PC 103 creates a specification request in a format that is in accordance with the protocol. As described later, the user performs this specification through a search result screen as shown in FIG. 10.

Figure 7A:
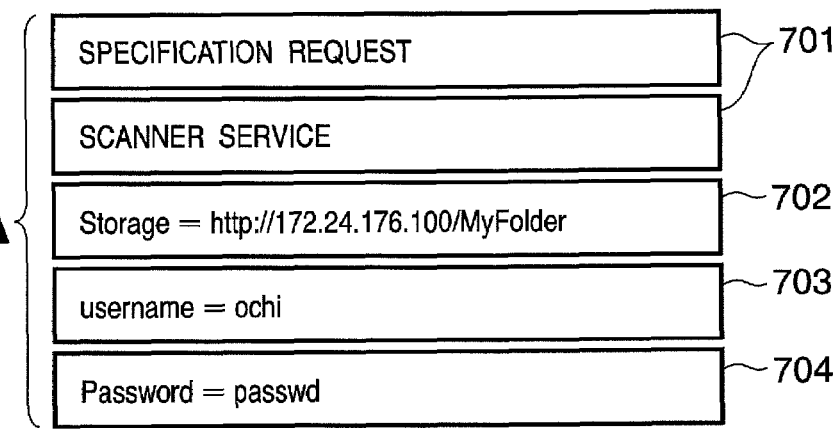
FIG. 7A to FIG. 7D are views showing examples of the format of a multifunction device specification request that is output by the PC 103 in an embodiment of the present invention.

FIG. 7A shows an example of a format that designates that scan data is to be transferred using the HTTP protocol. A field 701 indicates the type of packet and type of service, and in this case it is specified that the packet is a specification request and the service is a scanner service. A field 702 indicates the transfer destination of the scan data and the communication scheme to be used to transfer the scan data. As destination information that specifies the transfer destination and communication scheme (communication protocol), the address (172.24.176.100) of the PC 103, the folder name (MyFolder) and HTTP (http:) are specified. The information specifying the transfer destination and communication scheme is specified by an address description (http://172.24.176.100/MyFolder) that is in accordance with HTTP.

In this case, the client application can acquire an IP address that is assigned to the PC 103 when creating the specification request and a file path of a folder that is previously set as a transfer destination, and utilize these to create a specification request. In this connection, when specifying another device as a transfer destination it is necessary to set the address of that device and the file path of the transfer destination in advance.

Thus, since the client application automatically acquires address information and notifies the MFD, even in a case in which the address information of the PC changes dynamically the user has to simply specify the folder of the transfer destination without needing to be particularly aware of the address information.

A configuration may also be adopted in which, after the user specified a protocol and an MFD on the search result screen, the client application displays a dialog screen (selection screen) for allowing the user to specify a transfer destination, and causes the user to specify the transfer destination. This dialog screen may be a general dialog screen that is displayed at the time of a file selection in a GUI-based OS or application. The client application then acquires the file path of the selected folder and uses it for the address description of the transfer destination.

The MFD transfers the data that is obtained as a result of executing the service in accordance with the communication protocol and the transfer destination that were specified in the field 702.

The fields 703 and 704 display a user name and a password for logging in to the PC 103 that are necessary when transferring data. The client application acquires the user name and password at log in from the OS, and stores these values in the fields 703 and 704.

Figure 7B:
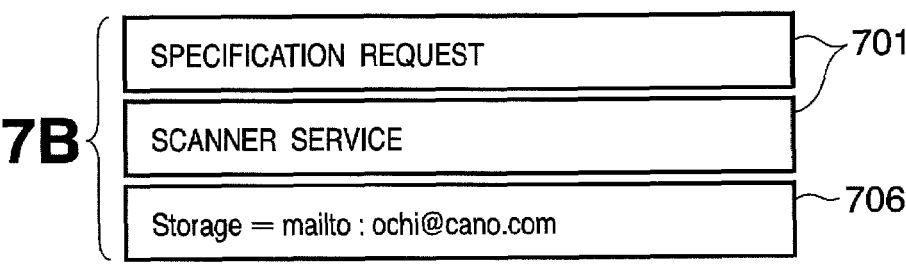

FIG. 7B shows an example of the format of a specification request that designates the transfer of scan data using the SMTP protocol. More specifically, it shows an example of a specification request that designates the transfer of scan data using electronic mail.

In this case, the email address of the user (ochi@cano.com) and electronic mail (mailto:) are specified as the destination information that specifies the transfer destination and communication scheme in the field 706. This email address is also previously set in the client application as a transfer destination. Naturally, in response to SMTP being specified as the communication protocol on the search result screen, the client application may display a screen for inputting or selecting an email address and cause the user to input or select an email address.

When utilizing email, since it is not necessary to log in to the PC 103, a user name and a password are not required.

Figure 7C:
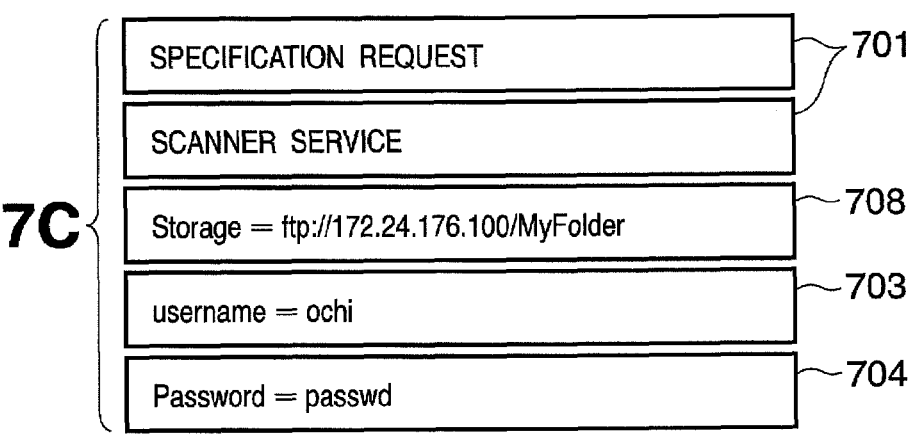

FIG. 7C shows an example of the format of a specification request that designates the transfer of scan data using the FTP protocol. The address (172.24.176.100) of the PC 103, the folder name (MyFolder) and FTP (ftp:) are specified as the destination information that specifies the transfer destination and communication scheme in the field 708. In this case, similarly to the case of specifying a transfer in HTTP format, the user name is specified in the field 703 and the password is specified in the field 704.

Figure 7D:
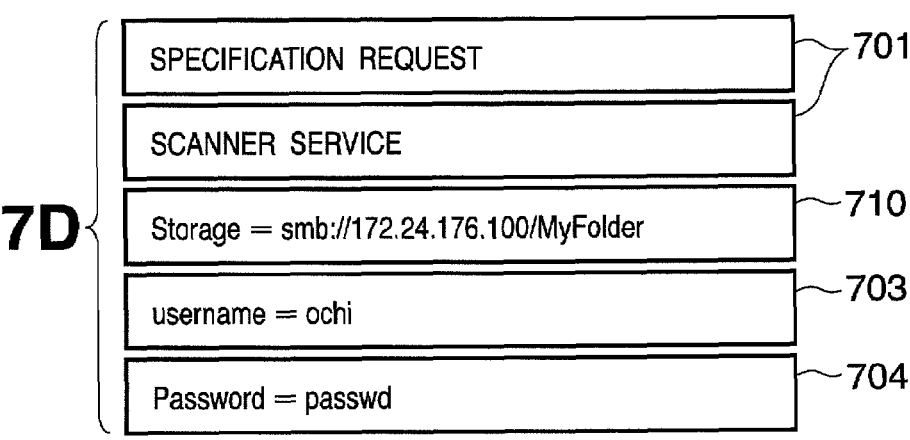

FIG. 7D shows an example of the format of a specification request that designates the transfer of scan data using the SMB protocol. The address (172.24.176.100) of the PC 103, the folder name (MyFolder) and SMB (smb:) are specified as the destination information that specifies the transfer destination and communication scheme in the field 710. In this case, similarly to the case of specifying a transfer in HTTP format, the user name is specified in the field 703 and the password is specified in the field 704.

Thus, since a user name and a password may be included in the specification request, preferably the specification request packet is sent using a communication channel that is encrypted using SSL or TSL or the like.

FIG. 8 is a view showing an example of the format of response data that is output by an MFD in response to a specification request in an embodiment of the present invention.

A field 801 indicates that the data is a response to a specification request and the type of service (scanner service) that is the object. In a field 803 is described a URL indicating the scanner service in the MFD 101.

A field 804 shows the destination ID, and in this case "1234" is stored therein.

A field 805 shows the term for which the destination ID that is stored in the field 804 is valid in the MFD. In FIG. 8, it is shown that the destination ID (1234) is valid in the MFD 101 (172.24.176.1) until 11 seconds and 11 minutes past 11 o'clock on Nov. 11, 2005.

Similarly to the specification request packets depicted in FIG. 7A to FIG. 7D, this response data is also sent on a communication channel that encrypts the communication contents to exchange packages.

By sending and receiving the specification request and response data on an encryption channel, it is possible to conceal the user name, password and destination ID.

FIG. 9 is a view showing an example of a destination ID table that is managed by the MFD 101.

In the example shown in FIG. 9, four destination IDs are registered, and this destination ID table is kept on the RAM 204. The destination ID table may also be stored on a non-volatile storage unit such as the NVRAM 205 or the HDD 207. Upon receiving a specification request, the MFD extracts the transfer destination from the specification request and determines the term of validity and the destination ID, and adds the transfer destination, the destination ID and the term of validity to the table.

FIG. 10 is a view showing an example of a search result screen that is displayed on the display 401 of the PC 103 after reception of response data with respect to a search request.

According to the present embodiment, MFDs 101 and 102 are present on the LAN 100, and response data is returned (steps S120 and S125) from each MFD in response to the search request at step S110 in FIG. 4. As described using FIG. 6, information of each MFD is included in the response data with respect to the search request. Therefore, the PC 103 can display a search result screen (list of MFDs) as shown in FIG. 10 based on the contents of the response data to the search request.

Based on the screen shown in FIG. 10, the user can ascertain that MFDs with addresses 172.24.176.1 and 172.24.176.10 are present on the LAN 100, and can also ascertain the location and performance of each MFD. More specifically the user can ascertain the following points. For the MFD with the address 172.24.176.1, the name of the MFD is iRC4000, the status is standby (idle), and the MFD has a color scanner. Further, the scan speed of the MFD is 40 sheets/min at A4 size, the MFD can scan original documents of a maximum size of A3, has an ADF option, and is located on the first floor (1F floor).

The MFD with the address 172.24.176.10 is named iR6000, the status is standby (idle), and the MFD has a black and white scanner. Further, the scan speed of the MFD is 60 sheets/min at A4 size, the MFD can scan original documents of a maximum size of A3, has an ADF option, and is located on the tenth floor (10F floor).

The user can select the MFD to be used by selecting one of the radio buttons provided at the left of the line corresponding to each MFD in the search result screen. In the example shown in FIG. 10, the MFD (MFD 101) with the address 172.24.176.1 is selected.

Further, it is also possible for the user to specify the communication protocol of the scan data by selecting any of radio buttons 1004, and in the example shown in FIG. 10 HTTP is specified.

Reference numeral 1001 denotes a search button. The user sends a search request (FIG. 5) by depressing this search button 1001 using the keyboard 403 or the pointing device 404 (step S110 of FIG. 4). The client application then displays the screen shown in FIG. 10 or updates the display contents using information included in the response data that is sent in response to the search request.

Reference numeral 1002 denotes an OK button. This button is used for indicating to the PC 103 that the user has decided to use the MFD that the user selected using radio buttons 1003 and the protocol that the user selected using radio buttons 1004.

In response to an operation that depresses the OK button 1002, the client application of the PC 103 generates a specification request (FIG. 7A to FIG. 7D) and sends the specification request to the MFD (172.24.176.1) that was selected by the user (step S130 in FIG. 4).

Figure 11:
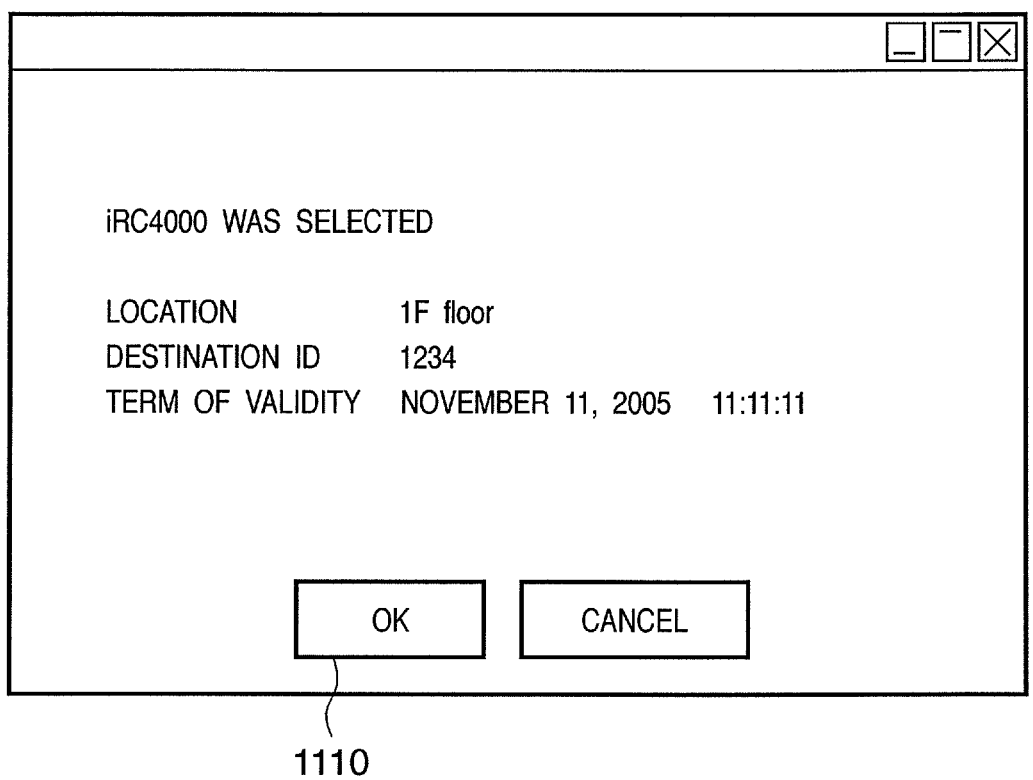
FIG. 11 is a view showing an example of a destination ID display screen that the PC 103 displays based on a multifunction device specification response that was received from a specified multifunction device in response to a multifunction device specification request in an embodiment of the present invention.

FIG. 11 is a view showing an example of a destination ID display screen that the PC 103 displays on the basis of response data with respect to a specification request, which was received from the MFD selected by the user.

The destination ID display screen displays the MFD (iRc4000) specified by the user and the location thereof, the destination ID (1234) that was assigned from the MFD and the term of validity of the destination ID (11 seconds and 11 minutes past 11 o'clock on Nov. 11, 2005). The information that is displayed other than the destination ID and the term of validity thereof can be set arbitrarily. Information other than the information shown in FIG. 11 that is preferably included is information relating to the communication protocol (in this case, HTTP) and the transfer destination (MyFolder).

By inputting the destination ID that is notified by means of the destination ID display screen into the selected MFD and designating that a scan be performed, the user can transfer scan data to the location that was specified by the user. Although in this case the transfer destination for scan data is the user's own PC 103, it will be easily understood by those skilled in the art that, for example, when utilizing SMTP, another arbitrary location can be specified by changing the email address. The same applies when using another protocol also.

In this connection, in the PC 103, information such as the received destination ID, the term of validity and the corresponding MFD is stored on the HDD 408 such that it can be accessed later.

Figure 12:
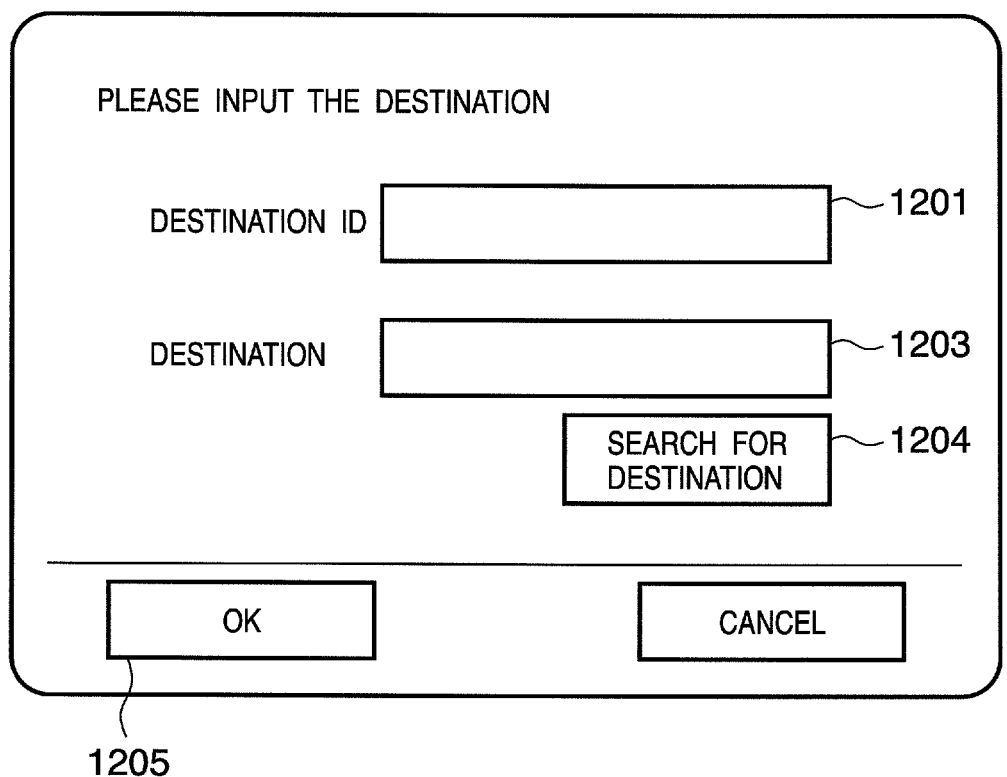
FIG. 12 is a view showing an example of a destination input screen that is displayed on a touch panel 301 of a multifunction device according to an embodiment of the present invention.

FIG. 12 is a view showing an example of a screen for inputting a destination that is displayed on the touch panel 301 of the MFD according to the present embodiment.

As described above, the user can start the scanner service by depressing the service button "S" that is provided among the various buttons 302 included on the input unit 214 of the MED.

When the CPU 202 of the MFD 101 detects, via the I/O control unit 209, that the service button "S" was depressed, it starts the scanner service. In the scanner service, since it is necessary to specify the destination of the scan data, the CPU 202 first displays a screen for specifying the destination on the touch panel 301. An example of the screen for specifying the destination is shown in FIG. 12.

In FIG. 12, in addition to a destination ID field 1201, the screen for specifying the destination has a destination field 1203 and a destination search button 1204 that are used in the conventional specification method.

According to the present embodiment, since the user knows the destination ID, the user inputs the destination ID (1234) into the destination ID field 1201 using the numeric keypad of the various buttons 302 and depresses the OK button 1205. Thereby, specification of the destination and communication method is complete.

Similarly to the conventional method, the destination can also be specified by directly entering the IP address of the PC 103 or an email address or the like in the destination field 1203. The destination can also be specified by the user depressing the destination search button 1204 to cause a list of devices on the LAN 100 to be displayed on the touch panel 301, and then finding and selecting the PC 103 from the list.

Figure 13:
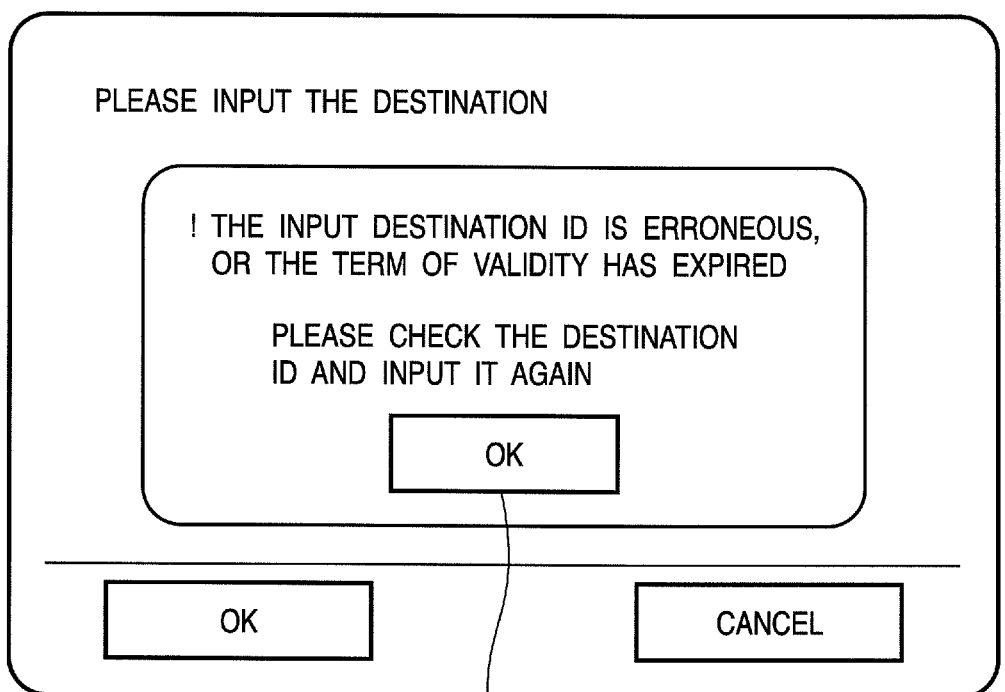
FIG. 13 is a view showing an example of an error screen that is displayed when an input destination ID is not valid according to an embodiment of the present invention.

When the OK button 1205 is depressed, the CPU 202 refers to the destination ID table that is stored in the RAM 204 to determine whether or not the input destination ID is valid. More specifically, the CPU 202 checks whether or not the input destination ID is present in the destination ID table, and if the destination ID is present the CPU 202 checks whether or not the term of validity has expired. If the input destination ID is not present in the destination ID table or if the destination ID is present but the term of validity has expired, the CPU 202 displays an error screen as shown in FIG. 13 on the touch panel 301 over the screen for specifying the destination. When the input destination ID is not present, it can be considered that a mistake occurred when inputting the destination ID or that the destination ID was input at a MFD that is different from the MFD that provided the destination ID.

When an error screen was displayed, the user depresses the OK button 1301 and re-inputs the destination ID from the screen for specifying the destination as shown in FIG. 12.

In contrast, when the input destination ID is present in the destination ID table and the term of validity has not expired, the CPU 202 displays a screen for the scan service that is shown in FIG. 14 on the touch panel 301. At this time, the CPU 202 knows from the destination ID table the transfer destination that corresponds to the destination ID that was input by the user.

In the example shown in FIG. 14, converting the scan data into a PDF file is selected by default, and it also possible to select conversion to a JPEG format file by a user operation.

The user places the original document that is to be scanned on an ADF or the platen comprised by the MFD, and after preparation is complete the user depressed the start button included in the various buttons 302. In response to depression of the start button, the CPU 202 controls the scanner engine 213 using the scanner control unit 201 to perform known scan processing. The MFD then reads the scan data to the RAM 204 and converts the data to a file in the specified data format. Further, the MED acquires information of the transfer destination corresponding to the destination ID from the destination ID table, and sends the scan data file that was generated to the transfer destination using the network control unit 210.

Figure 15:
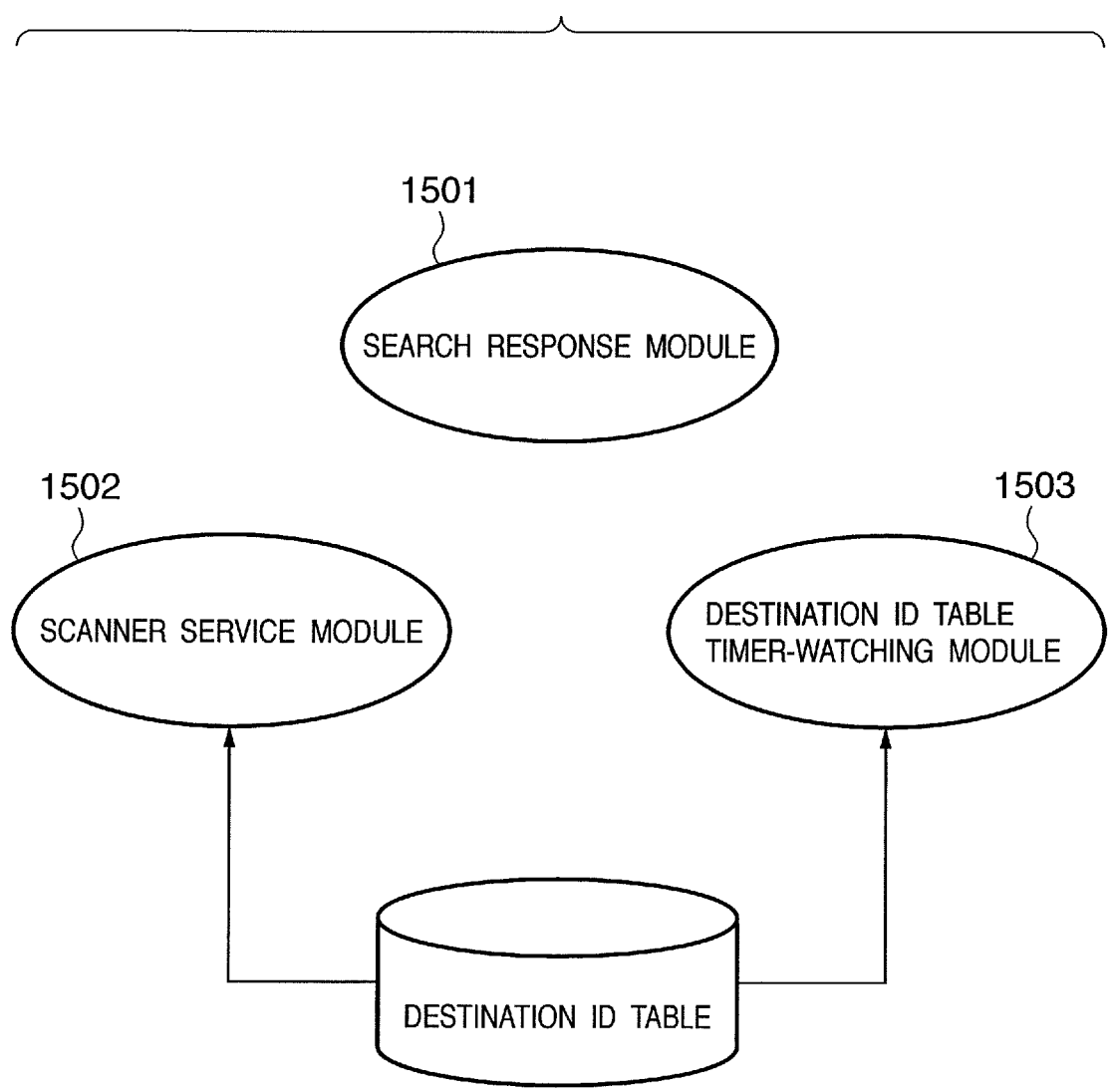
FIG. 15 is a schematic diagram that illustrates program modules relating to provision of a scanner service in a multifunction device according to an embodiment of the present invention.

FIG. 15 is a schematic diagram that shows program modules for implementing the above-described operations in the MFD according to the present embodiment.

In this embodiment, a search response module 1501, a scanner service module 1502 and a destination ID table timer watching module (hereafter, referred to simply as "timer watching module") 1503 are in operation at the MFDs 101 and 102. The scanner service module 1502 and the timer watching module 1503 access the destination ID table.

These modules are, for example, stored on the HDD 207 and are readout to the RAM 204 at startup of the MFD and are executed as resident processes.

Hereafter, the operations of the PC 103 and the MFDs 101 and 102 are described further.

Figure 16:
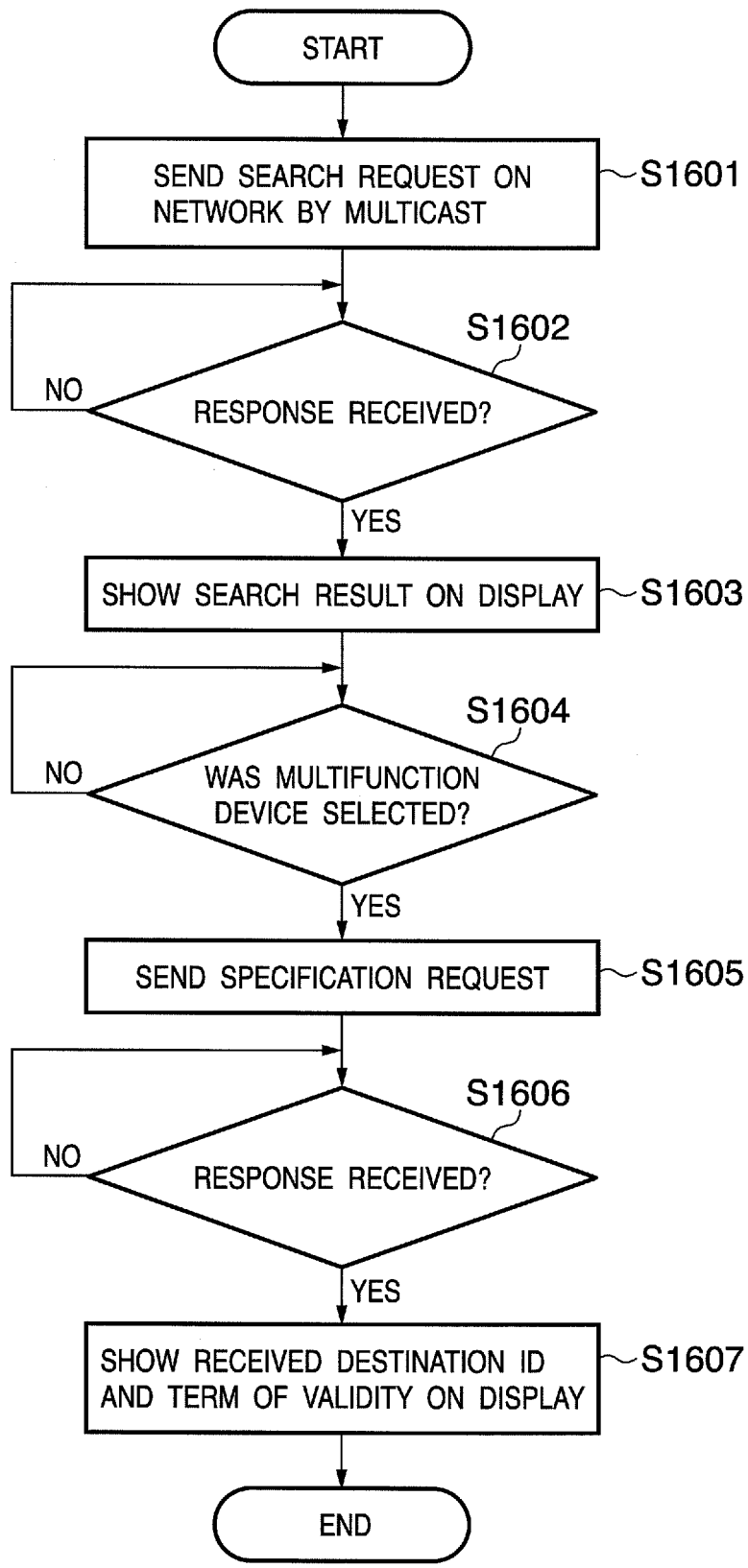
FIG. 16 is a flowchart that illustrates the operation of the PC 103 according to this embodiment.

FIG. 16 is a flowchart that describes the operations of the PC 103 according to the present embodiment.

As described above, it is assumed that the user's PC 103 is already connected to the LAN 100 and is in a state communicable state. Further, the MFD 101 has the IP address 172.24.176.1 and the MFD 102 has the IP address 172.24.176.10. The PC 103 is assumed to have the IP address 172.24.176.100. Further, a search request is not automatically performed at startup of the client application, and instead the search result screen (FIG. 10) is displayed on the display 401. At this time, since a search request is not performed, nothing is displayed in the list of MFDs.

In this state, the user operates the keyboard 403 or the pointing device 404 to perform an operation that depresses the search button 1001 on the search screen shown in FIG. 10.

In response to this operation, the client application of the PC 103 multicasts or broadcasts a packet of the search request illustrated in FIG. 5 on the LAN 100 through the network interface 411 (step S1601).

The client application then determines whether or not response data exists from the MFD providing the scanner service (step S1602). Each of the MFDs 101 and 102 returns a packet of the response data illustrated in FIG. 6 to the PC 103. Upon receiving packets of response data through the network interface 411, the client application extracts the information included in the packets and displays a list of MFDs in the form shown in FIG. 10 (step S1603). This processing is performed for all packets of response data received until a predetermined time elapses.

The client application then determines whether or not an MFD was selected (step S1604). According to the present embodiment, it is assumed that the user specified to transfer scan data by the HTTP protocol from the MFD 101 (IP address 172.24.176.1) to the "MyFolder" folder of the PC 103, and performed an operation to depress the OK button 1002.

When an MFD was selected, the client application acquires the selection result and generates a packet of a specification request as shown in FIG. 7A. This specification request includes destination information (http://172.24.176.100/MyFolder) showing that the IP address (172.24.176.100) of the PC 103, the specified folder name (MyFolder) and that HTTP is to be used. The client application then sends the generated specification request packet to the MFD 101 (172.24.176.1) that was selected by the user through the network interface 411 (step S1605). In this case, the user name and password that the user uses when logging in to the PC 103 are used as the user name 703 and the password 704 included in the specification request packet.

After sending the specification request packet, the client application determines whether or not response data corresponding to the specification request is present (step S1606). When a packet of response data corresponding to the specification request has been received from the MFD 101, the client application reads out the destination ID and term of validity from the packet of response data as shown in FIG. 8. The client application then displays a destination ID display screen as shown in FIG. 11 on the display 401 to notify the values that were readout to the user.

When the user confirms the destination ID and the term of validity and performs an operation to depress the OK button 1110 on the destination ID display screen, the processing of the client application ends.

Through this series of processes, the user specifies the MED whose service is to be utilized and also acquires the destination ID from that MFD.

Next, the processing on the MFD 101 side will be described.

The processing of the MFD 101 can be broadly divided into (1) processing when a search request is received, (2) processing when an MFD specification request is received, and (3) service processing.

(1) Processing when a Search Request is Received

Processing for a search request is performed by the search response module 1501.

First, the search response module 1501, at startup, acquires information (scanner information) relating to the capability of the scanner engine 213 through the scanner control unit 201, and retains the information on the RAM 204. Thereafter, the search response module 1501 monitors reception of search requests through the network control unit 210. Upon reception of a search request as shown in FIG. 5, the search response module 1501 generates a packet of response data as shown in FIG. 6 using the scanner information that was retained on the RAM 204 when the power was turned on. The search response module 1501 then sends back the packet of response data to the PC 103 that is the source of the search request, through the network control unit 210.

(2) Processing when a Specification Request is Received

Figure 17:
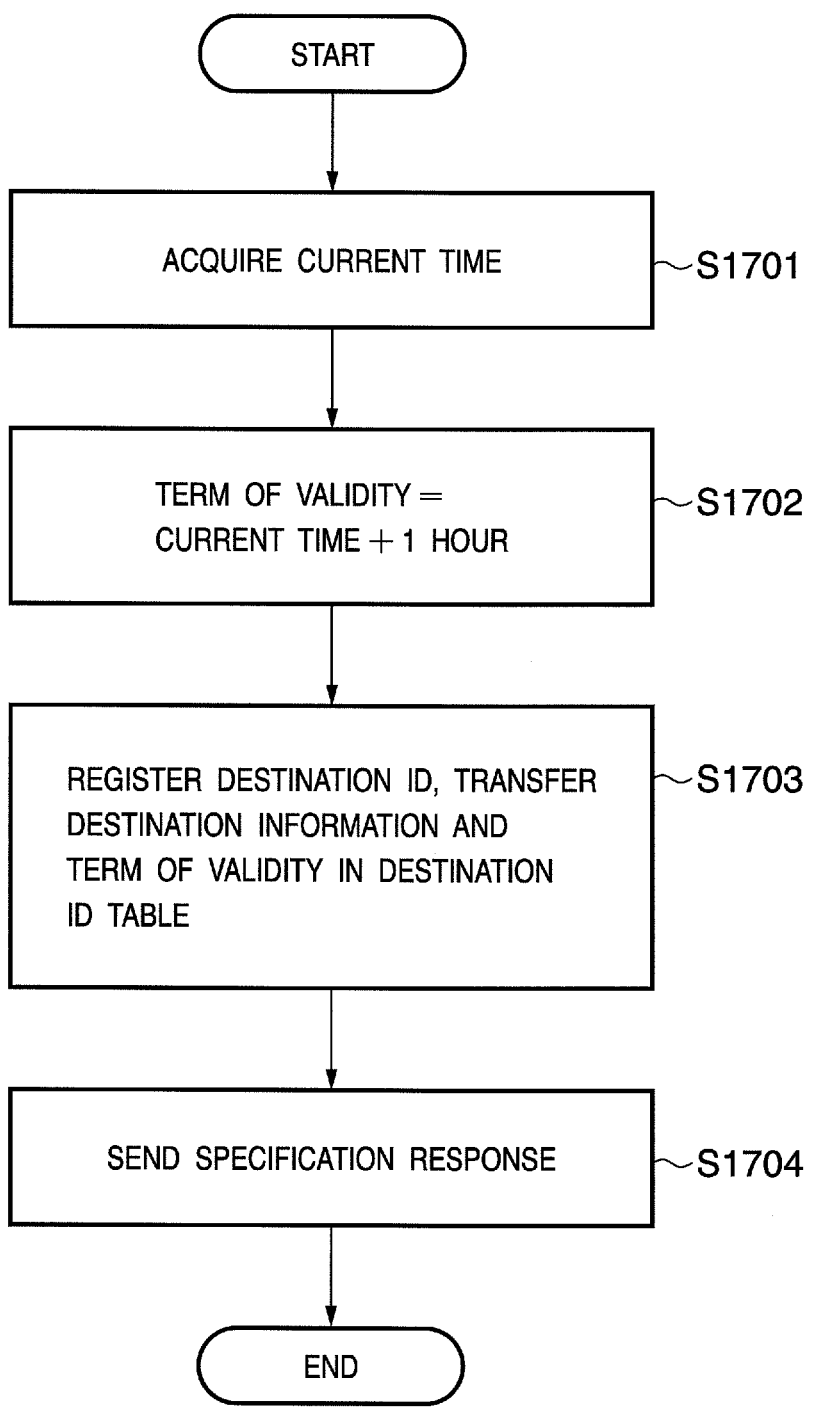
FIG. 17 is a flowchart that illustrates processing when a multifunction device specification request is received in a multifunction device according to an embodiment of the present invention.

FIG. 17 is a flowchart that describes the processing when a specification request is received.

This processing is executed by the scanner service module 1502. The scanner service module 1502 monitors reception of specification requests through the network control unit 210.

Upon reception of a packet of a specification request as shown in FIG. 7A to FIG. 7D, the scanner service module 1502 acquires the current time from the timer 208 (step S1701) The scanner service module 1502 then decides the destination ID and the term of validity (step S1702). In this case, as one example, the term of validity is taken as a value obtained by adding one hour to the current time. Although a method of deciding the term of validity is not particularly limited, when the term of validity is made too long the risk of unauthorized use increases. Further, when the term of validity is too short, the convenience of the user is compromised. In this connection, when transferring data by a protocol that uses a user name or login password for logging in to the PC 103 of the user (in this embodiment, transfer using a protocol other than SMTP), as a security measure the term of validity is preferably set as a short term.

Next, the scanner service module 1502 provides a destination ID as identification information of the specification request. The destination ID may be provided according to any rule, as long as two or more of the same destination IDs are not valid at the same time. Although in the present embodiment the destination ID is four numeric characters, the number of digits can be increased or decreased. Further, if input from the input unit 214 of the MFD can be easily performed, characters other than numeric characters may be used for at least a part of the destination ID.

The scanner service module 1502 then registers the provided destination ID, information necessary for data transfer, and the term of validity calculated at step S1702 in association with each other in the destination ID table (FIG. 9) (step S1703). According to this embodiment, the information necessary for data transfer is the destination information that is entered in the field 702. In FIG. 9, the destination ID (1234), destination information (http://172.24.176.100/MyFolder) and term of validity (11 seconds and 11 minutes past 11 o'clock on Nov. 11, 2005) are retained. The destination ID table is retained on the RAM 204.

Next, the scanner service module 1502 creates a packet of response data as shown in FIG. 8, and sends the packet of response data through the network control unit 210 to the source of the specification request packet, that is, the terminal (PC 103) that is the source of the service request (step S1704).

As described above, the PC 103 that received this packet of response data displays a destination ID display screen as shown in FIG. 11 on the display 401 to notify the destination ID to the user.

(3) Service Processing

Figure 18:
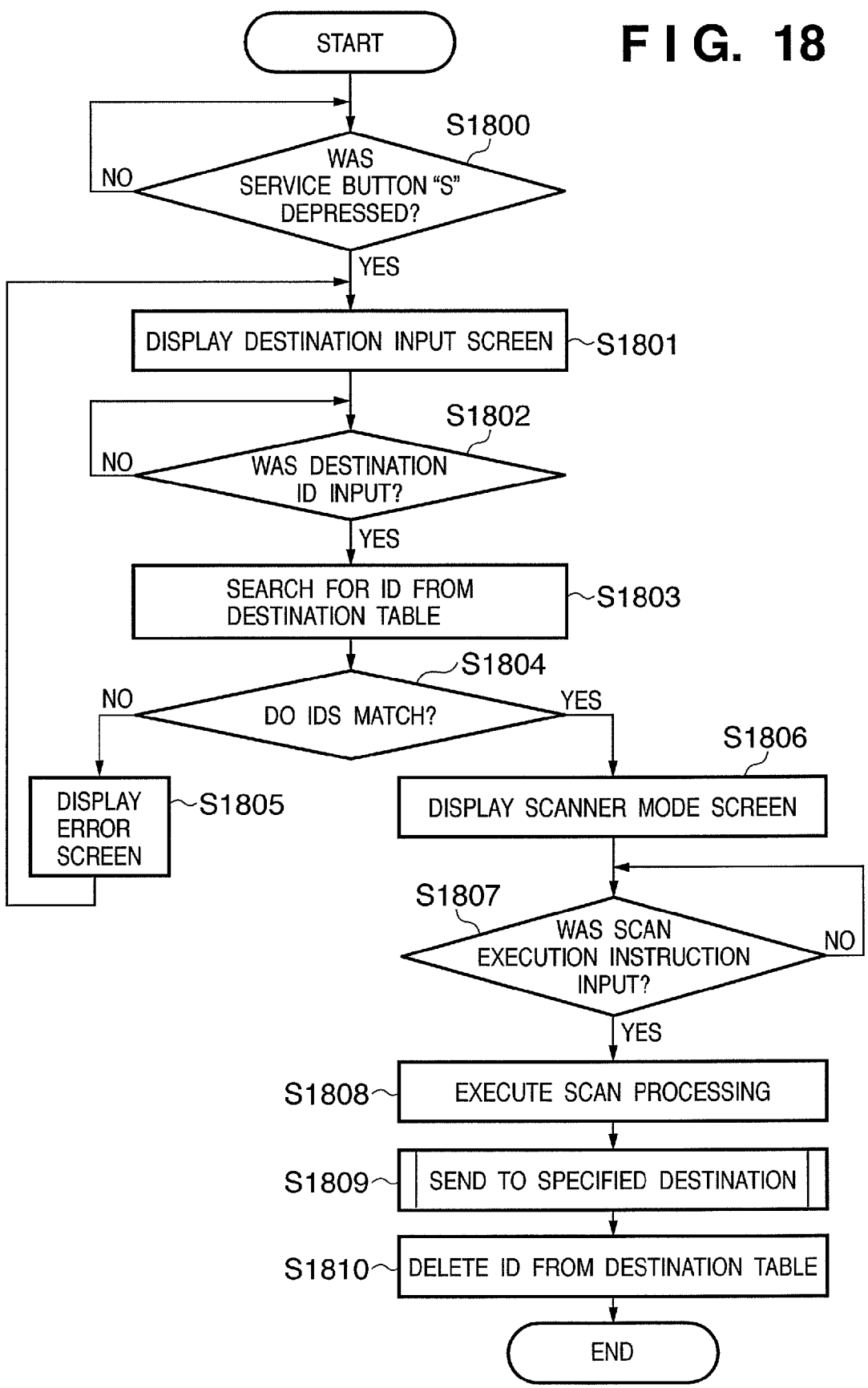
FIG. 18 is a flowchart that illustrates network scan processing in a multifunction device according to an embodiment of the present invention.

FIG. 18 is a flowchart that describes network scan processing.

This processing is executed by the scanner service module 1502. The scanner service module 1502 monitors inputs on the input unit 214, particularly depression of the service button "S" through the I/O control unit 209. The scanner service module 1502 then determines whether or not the service button "S" was depressed (step S1800).

When the user depresses the service button "S" included in the various buttons 302 of the input unit 214, the scanner service module 1502 displays a destination input screen as shown in FIG. 12 on the touch panel 301 (step S1801). The scanner service module 1502 then determines whether or not a destination ID was input and the OK button 1205 was depressed (step S1802).

As described above, when input other than input of a destination ID was performed from the destination input screen, processing that is the same as the conventional processing is performed. A description of this conventional processing is omitted here. The term "input other than input of a destination ID" refers to a case of directly inputting an address to the destination field 1203 and depressing the OK button 1205 or a case of depressing the destination search button 1204.

When a destination ID was input and the OK button 1205 depressed, the scanner service module 1502 searches the destination ID table (FIG. 9) that is stored on the RAM 204 (step S1803). The scanner service module 1502 then determines whether or not the input destination ID is present in the destination ID table (step S1804).

When the input destination ID is not present in the destination ID table, the scanner service module 1502 displays an error screen (FIG. 13) on the display 401 (step S1805). When the user makes a confirmation input (depresses the OK button) on the error screen, the scanner service module 1502 again displays the destination input screen (step S1801).

In contrast, when the input destination ID is present in the destination ID table, the scanner service module 1502 displays the scan screen (FIG. 14) on the touch panel 301 (step S1806). The scanner service module 1502 then determines whether or not a scan execution instruction was made by the user (step S1807).

The user places the original document on the platen or ADF provided in the scanner engine 213, selects the data format of the scan data (in this case, PDF or JPEG), and depresses the start button (FIG. 3).

When the scanner service module 1502 detects a scan execution instruction (depression of the start button), it executes scan processing (step S1808). More specifically, it reads the original document on the scanner engine 213 through the scanner control unit 201, and reads bitmap data (scan data) into the RAM 204. It then converts that bitmap data into the specified data format. Since PDF was selected in the present embodiment, it sequentially converts the bitmap data into a PDF file.

When the scanner service module 1502 creates the scan data file, it sends that file to the transfer destination corresponding to the destination ID among the transfer destinations registered in the destination ID table (step S1809) This sending processing is described in detail later. When the sending processing is completed, the scanner service module 1502 deletes the destination ID corresponding to the completed sending processing from the destination ID table stored in the RAM 204. It then returns the display of the touch panel 301 to a copy screen as shown in FIG. 3, and ends the processing (step S1810).

Figure 20:
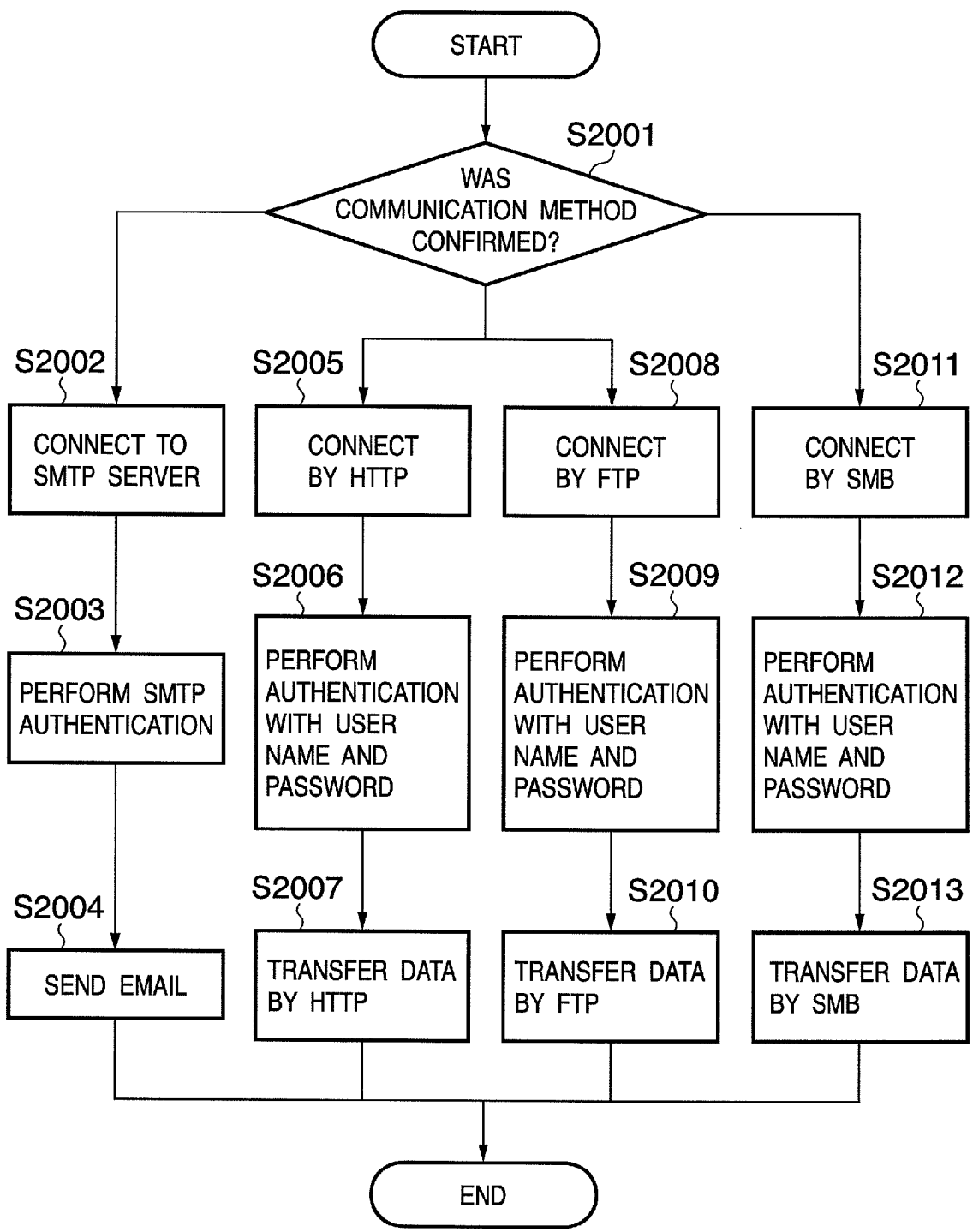
FIG. 20 is a flowchart that illustrates the details of sending processing that is performed in step S1809 in FIG. 18.

Next, the details of the sending processing performed at step S1809 will be described using the flowchart shown in FIG. 20.

When sending data to the transfer destination that corresponds to the destination ID, the scanner service module 1502 first confirms the communication method (step S2001). The communication method is specified in the destination specification field (702, 706, 708 or 710) in the specification request. More specifically, it is described as information (http, mailto, ftp, smb) that identifies the type of communication protocol in a character string following "Storage=". Accordingly, the scanner service module 1502 can confirm the communication method by referring to the destination information that is stored in the destination ID table.

More specifically, when the destination information begins with "mailto:" the scanner service module 1502 determines that the scan data file is to be sent by electronic mail. The scanner service module 1502 then creates an electronic mail that is addressed to the address indicated by the character string following "mailto:" (for example, in FIG. 7B "ochi@cano.jp") and attaches the scan data file as an attachment file to that electronic mail. In this connection, the electronic mail can be created in advance as a standard sentence.

Thereafter, the scanner service module 1502 connects to an unshown SMTP server through the network control unit 210 (step S2002). The scanner service module 1502 then performs authentication processing with the SMTP server (step S2003) using authentication information (login name and password) that is previously set for the SMTP server, and sends the electronic mail (step S2004).

Further, when the destination information begins with "http:" the scanner service module 1502 determines that the scan data file is to be sent by HTTP, and makes a connection by HTTP to the address indicated by the character string that follows "http:" (step S2005). In this case, since the destination information indicates a folder named "MyFolder" of the user's PC 103, the scanner service module 1502 presents the folder name "MyFolder" to the http server module of the PC 103. In response thereto, the http server module that is operating at the PC 103 requests authentication from the scanner service module 1502. The scanner service module 1502 responds to this request by sending the authentication information (user name and password) that was sent in the specification request packet (FIG. 7A) (step S2006). When authentication has been completed, the scanner service module 1502 transfers the scan data file to "MyFolder" of the PC 103 based on HTTP (step S2007).

In this connection, when the destination information begins with "https:", it is sufficient to perform the same processing as that for communication by HTTP, with the exception that encryption is performed using SSL.

Further, when the destination information begins with "ftp:" the scanner service module 1502 determines that the scan data file is to be sent by FTP, and connects by FTP to the address indicated by the character string following "ftp:" (step S2008). In this case, since the FTP address indicates a folder named "MyFolder" of the user's PC 103, the scanner service module 1502 presents the folder name "MyFolder" to the ftp server module of the PC 103. In response thereto, the ftp server module that is operating at the PC 103 requests authentication from the scanner service module 1502. The scanner service module 1502 responds to this request using the user name and password that were sent in the specification request packet (FIG. 7C) (step S2009). When authentication has been completed, the scanner service module 1502 transfers the scan data file to "MyFolder" of the PC 103 based on FTP (step S2010).

When the destination information begins with "smb:" the scanner service module 1502 determines that the scan data file is to be sent by SMB, and connects by SMB to the address indicated by the character string following "smb:" (step S2011). In this case, since the SMP address indicates a folder named "MyFolder" of the user's PC 103, the scanner service module 1502 presents the folder name "MyFolder" to the smb server module of the PC 103. In response thereto, the smb server module that is operating at the PC 103 requests authentication from the scanner service module 1502. The scanner service module 1502 responds to this request using the user name and password that were sent in the specification request packet (FIG. 7D) (step S2012). When authentication has been completed, the scanner service module 1502 transfers the scan data file to "MyFolder" of the PC 103 based on SMB (step S2013).

In the PC 103, the modules that perform communication by HTTP, FTP and SMB may be modules that are generally provided as functions (services) of the OS. Activation and stopping of these services can be controlled by the setting of the OS. Accordingly, it is sufficient for the user to make the settings of the OS such that communication to the PC 103 from outside is enabled in the protocol utilized for data transfer.

In this manner, the scanner service module 1502 can make a connection to the specified transfer destination in the specified protocol to transfer the scan data.

Figure 19:
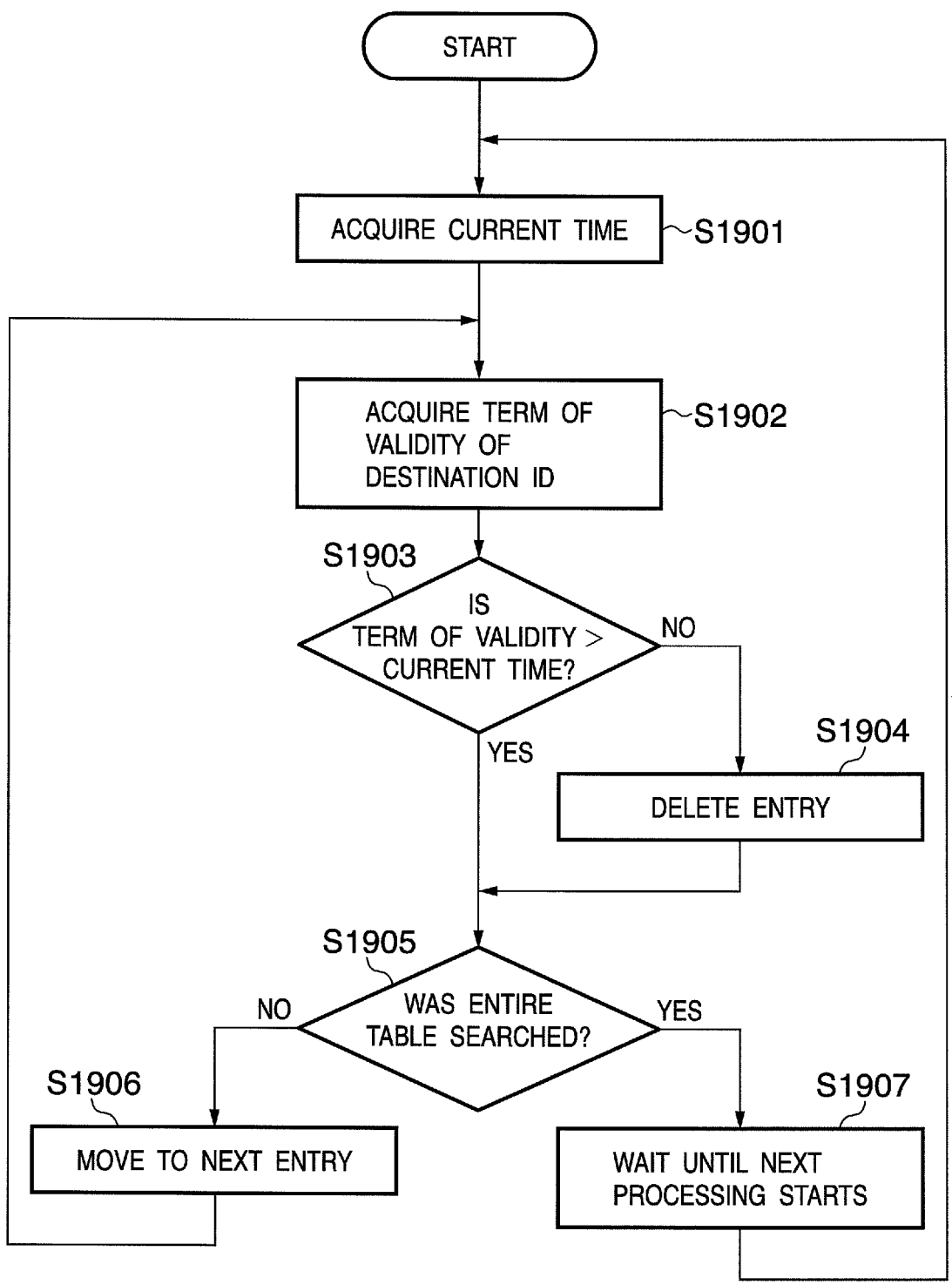
FIG. 19 is a flowchart that illustrates processing of a destination ID table timer watching module 1503 in a multifunction device according to an embodiment of the present invention.

Finally, processing of the destination ID table timer watching module 1503 will be described using the flowchart shown in FIG. 19.

The destination ID table timer-watching module (timer-watching module) 1503 is a module that performs an update process for the destination ID table. More specifically, the timer watching module 1503 periodically checks the destination ID table, and if a destination ID whose term of validity has been exceeded exists, the timer watching module 1503 deletes that destination ID from the table.

The timer-watching module 1503 acquires the current time from the timer 208 (step S1901). Next, the timer watching module 1503 acquires the term of validity of one destination ID that is registered in the destination ID table that was stored in the RAM 204 (step S1902). The timer watching module 1503 then checks whether the acquired term of validity has been exceeded (step S1903).

When the current time has not yet reached the term of validity, the timer-watching module 1503 performs no particular operation. However, when the current time has exceeded the term of validity, the timer watching module 1503 deletes the entry (the destination ID and all registration information associated with the destination ID) that includes that term of validity from the destination ID table (step S1904).

In step S1905, the timer-watching module 1503 determines whether or not the term of validity was checked for all destination IDs in the destination ID table. When a destination ID that should be checked still exists, taking the term of validity of the next destination ID as the check object (step S1906), the process returns to step S1902 to check the term of validity.

In step S1905, when checking of the term of validity of all destination IDs is completed, the timer-watching module 1503 stands by for a predetermined time (in this case, one minute) (step S1907). Thereafter, the timer watching module 1503 repeats the process from step S1901. In this manner, the timer watching module 1503 checks the term of validity of destination IDs at predetermined time intervals, and deletes entries that include a destination ID for which the term of validity has elapsed from the destination ID table.

As described above, according to the present embodiment, an MED that provides a remote service provides identification information in response to a service request, and stores the information together with information necessary for data transfer. The MFD also sends the identification information to the terminal that is the source of the service request. The result of service processing that was specified by the identification information is transferred to a transfer destination that was stored in association with the identification information.

Therefore, a user that wants to utilize a service provided by the MFD can make a service request to the desired MFD along with the desired transfer destination from a terminal that can communicate with the MFD, and can specify the transfer destination by using an identification number that was provided from the MFD.

It is thus possible to eliminate the effort that was conventionally required to input an IP address or find a desired transfer destination among a large number of transfer destination candidates and to suppress the occurrence of erroneous transfers. Even when the address of an information processing terminal that was specified as a transfer destination is dynamically assigned, since it is not necessary for the user to be aware of that fact, the convenience to the user is particularly high. Further, in addition to the transfer destination, it is also possible to specify the communication protocol at the same time.

Furthermore, since a term of validity is set for the destination IDs in the MFD and a destination ID whose term of validity has expired is invalidated, it is possible to suppress misuse of the destination ID.

Other Embodiments

Although according to the above-described embodiment a destination ID is deleted when it is used once, even when it is within the term of validity, utilization of the destination ID a plurality of times as long as it is within a predetermined time may also be enabled. For example, by permitting repeated utilization within a 10 minute period, in a case where a user wants to transfer processing results for different original documents to the same place the operations can be executed in succession within the term of validity of a single identification number, and the time and labor of the user can be saved.

In this case, a period for which repeated utilization is permitted and the term of validity of an unused destination ID can be set separately. For example, a form can be considered in which the term of validity is set as one hour for an unused state, and if the destination ID is used even once the destination ID can be repeatedly utilized for a period of 10 minutes from the time of first use, and when that 10 minutes elapses the destination ID is invalidated.

Furthermore, it is to be understood that a computer program itself that is supplied to a computer in order to implement the above-described embodiment by computer also implements the present invention. In other words, the claims of the present invention also cover a computer program for the purpose of implementing the functions of the above-described embodiment.

In this case, so long as the computer program for implementing the above-described embodiment can be read by a computer, the computer program may be executed in any form. For example, the computer program may be executed as object code, a program executed by an interpreter, or script data supplied to an operating system, and a form of execution is not limited to these.

The computer program for the purpose of implementing the above-described embodiment may be supplied to a computer on a storage medium or by wire/wireless communication. Examples of the storage medium for supplying the computer program include a magnetic storage medium such as a flexible disk, a hard disk or a magnetic tape, an optical/magneto-optical storage medium such as an MO, a CD or a DVD, and a nonvolatile semiconductor memory.

As for the method of supplying the computer program using wire/wireless communication, a method is available that utilizes a server on a computer network. In this case, a data file (program file) that can serve as a computer program constituting the present invention is stored on a server. The program file may be a file in executable form or may be a source code.

The program file can then be supplied to a client computer that accessed this server by the client computer downloading the program file. In this case, the program file can be divided into a plurality of segment files and the segment files can be distributed to different servers.

In other words, a server device that supplies the program file for implementing the above-described embodiment to a client computer is also covered by the claims of the present invention.

Further, it is also possible to encrypt and store the computer program for implementing the above-described embodiment on a storage medium, distribute the storage medium to users, and supply decryption key information to users who meet certain requirements to enable installation of the computer program in the user computer. The key information can be supplied, for example, by downloading from a homepage through the Internet.

Furthermore, the computer program for implementing the above-described embodiment may utilize the functions of an operating system that is already running on the computer.

Furthermore, a part of the computer program for implementing the above-described embodiment may be constituted by firmware such as an expansion board that is inserted into a computer, and a CPU that is mounted on the expansion board may execute the computer program.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2006-029748 filed on Feb. 7, 2006, which is hereby incorporated by reference herein in its entirety.

What is claimed is:

1. A data processing apparatus, comprising:
    an input unit for a user to input information;
    a reception unit which receives destination information indicating a data transfer destination;
    a determining unit which determines first identification information that corresponds to the destination information received by the reception unit;
    a storage unit which stores the first identification information and the destination information in association with each other;
    an execution unit which generates data; and
    a transfer unit which transfers the generated data to the data transfer destination indicated by the destination information that corresponds to the first identification information, when the first identification information is input through the input unit,
    wherein the determining unit determines identification information that is distinguishable from other identification information previously stored in the storage unit, and
    wherein the data processing apparatus further comprises:
    a setting unit which sets a term of validity of the first identification information; and
    an invalidating unit which automatically invalidates the stored first identification information based on the term of validity,
    wherein the setting unit sets a first term of validity of the first identification information and a second term of validity of the first identification information,
    wherein the first term of validity indicates a term in which non-used identification information is valid,
    wherein the second term of validity indicates a term in which repetitive use of used identification information is allowed, and
    wherein the invalidating unit automatically invalidates the stored first identification information based on the first term of validity for non-used identification information and on the second term of validity for used identification information.

2. The data processing apparatus according to claim 1, further comprising a display unit which displays an error screen when identification information input through the input unit is not stored in the storage unit.

3. The data processing apparatus according to claim 1, further comprising a sending unit which sends the first identification information to a terminal that is a source of the destination information, wherein the sending unit sends a term of validity of the first identification information together with the first identification information.

4. The data processing apparatus according to claim 1, wherein,
    the destination information includes an address of a transfer destination and information regarding a communication protocol to be used for transferring, and
    the transfer unit transfers data to the address by a communication protocol indicated by the information regarding the communication protocol.

5. The data processing apparatus according to claim 1, wherein,
    the reception unit receives the destination information and authentication information corresponding to the destination information, and
    when connection authentication with the data transfer destination is necessary, the transfer unit conducts authentication using the authentication information received by the reception unit.

6. The data processing apparatus according to claim 5, wherein the authentication information includes a user name and a password.

7. A non-transitory computer readable storage medium which stores a computer-executable data processing program, the program comprising:
    first receiving instructions configured to receive destination information indicating a data transfer destination;
    determining instructions configured to determine first identification information that corresponds to the destination information;
    storing instructions configured to store the first identification information and the destination information in association with each other in a storage unit;
    generating instructions configured to generate data;
    second receiving instructions configured to receive user input of the first identification information; and
    transferring instructions configured to transfer the data generated according to the generating instructions to the data transfer destination indicated by the destination information that corresponds to the first identification information, when the user input of the first identification information is received according to the second receiving instructions, wherein the determining instructions are configured to determine identification information that is distinguishable from other identification information previously stored in the storage unit, and wherein the program further comprises:

setting instructions configured to set a term of validity of the first identification information; and invalidating instructions configured to automatically invalidate the stored first identification information based on the term of validity, wherein the setting instructions are configured to set a first term of validity of the first identification information and a second term of validity of the first identification information, wherein the first term of validity indicates a term in which non-used identification information is valid, wherein the second term of validity indicates a term in which repetitive use of used identification information is allowed, and wherein the invalidating instructions are configured to automatically invalidate the stored first identification information based on the first term of validity for non-used identification information and on the second term of validity for used identification information.

8. A data processing method implemented by a data processing apparatus, the method comprising the steps of:

receiving destination information indicating a data transfer destination;

determining first identification information that corresponds to the destination information;

storing the first identification information and the destination information in association with each other in a storage unit;

generating data;

receiving user input of the first identification information; and transferring the generated data to the data transfer destination indicated by the destination information that corresponds to the first identification information, when the user input of the first identification information is received, wherein the determining step includes determining identification information that is distinguishable from other identification information previously stored in the storage unit, and wherein the method further comprises the steps of:

setting a term of validity of the first identification information; and automatically invalidating the stored first identification information based on the term of validity, wherein the setting step includes setting a first term of validity of the first identification information and a second term of validity of the first identification information, wherein the first term of validity indicates a term in which non-used identification information is valid, wherein the second term of validity indicates a term in which repetitive use of used identification information is allowed, and wherein the invalidating step includes automatically invalidating the stored first identification information based on the first term of validity for non-used identification information and on the second term of validity for used identification information.

* * * * *